United States Patent
Lee

(10) Patent No.: US 10,687,671 B2
(45) Date of Patent: Jun. 23, 2020

(54) COOKWARE ARTICLE AND UTENSIL HANDLE

(71) Applicant: Meyer Intellectual Properties Limited, Kowloon (HK)

(72) Inventor: Kwong Wah Lee, Hong Kong (CN)

(73) Assignee: Meyer Intellectual Properties Limited (VG)

( * ) Notice: Subject to any disclaimer, the term of this patent is extended or adjusted under 35 U.S.C. 154(b) by 72 days.

(21) Appl. No.: 15/927,676

(22) Filed: Mar. 21, 2018

(65) Prior Publication Data

US 2018/0271331 A1    Sep. 27, 2018

Related U.S. Application Data

(60) Provisional application No. 62/474,328, filed on Mar. 21, 2017.

(51) Int. Cl.
| | |
|---|---|
| *B65D 21/032* | (2006.01) |
| *A47J 45/06* | (2006.01) |
| *A47J 43/28* | (2006.01) |
| *A47J 45/00* | (2006.01) |
| *B65D 21/02* | (2006.01) |

(52) U.S. Cl.
CPC ........... *A47J 45/061* (2013.01); *A47J 43/288* (2013.01); *A47J 45/00* (2013.01); *B65D 21/0233* (2013.01)

(58) Field of Classification Search
CPC .............. B65D 21/023; B65D 21/0231; B65D 21/0233; B65D 25/2808; A47J 45/061; A47J 45/071; A47J 45/06
USPC ....................................................... 220/756
See application file for complete search history.

(56) References Cited

U.S. PATENT DOCUMENTS

| | | | |
|---|---|---|---|
| 403,656 A * | 5/1889 | Gerstle | |
| 3,269,765 A * | 8/1966 | Pryce | A47J 45/071 294/31.1 |
| 5,957,038 A | 9/1999 | Shimazaki | |
| 8,272,531 B2 * | 9/2012 | Cuillery | A42B 3/322 206/514 |

(Continued)

FOREIGN PATENT DOCUMENTS

| | | |
|---|---|---|
| CN | 204862595 U | 12/2015 |
| EP | 1 876 935 B1 | 9/2008 |

(Continued)

OTHER PUBLICATIONS

International Search Report issued in International Application No. PCT/CN2018/079906, dated Jun. 4, 2018.

(Continued)

*Primary Examiner* — Stephen J Castellano
(74) *Attorney, Agent, or Firm* — Akerman LLP

(57) ABSTRACT

A stackable cookware article system may include a stackable handle having a grip portion including a projection and a hole configured for stacking with similarly configured handles. The hole may be adapted to receive in at least an upper inner surrounding portion a complimentary downward extending projection that extends from a substantially similar grip portion. When stacked, cookware articles, such as a series of vessels having progressively decreasing diameters, deploying the handle may stably stack in nested arrangements external portions of an inner nested vessel contacting the internal portion of an outer surrounding vessel in which it nests.

22 Claims, 14 Drawing Sheets

(56) References Cited

U.S. PATENT DOCUMENTS

2017/0197755 A1    7/2017   LePinske et al.

FOREIGN PATENT DOCUMENTS

| FR | 1301322 A | 8/1962 |
|---|---|---|
| JP | 2013128543 A | 7/2013 |
| WO | 2006/100367 A1 | 9/2006 |

OTHER PUBLICATIONS

Written Opinion of the International Searching Authority issued in International Application No. PCT/CN2018/079906, dated Jun. 4, 2018.

* cited by examiner

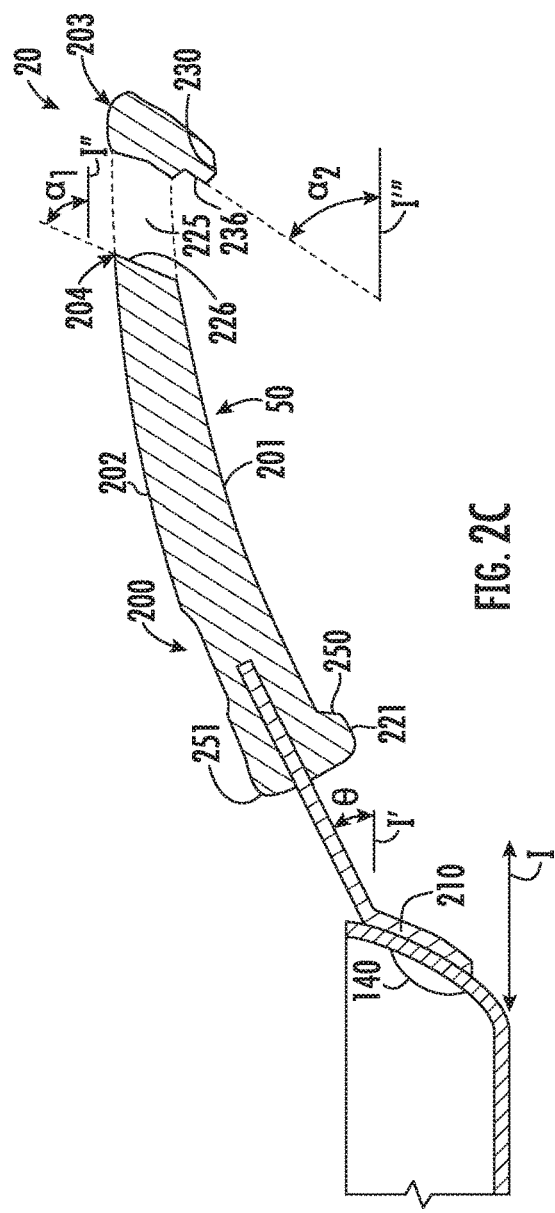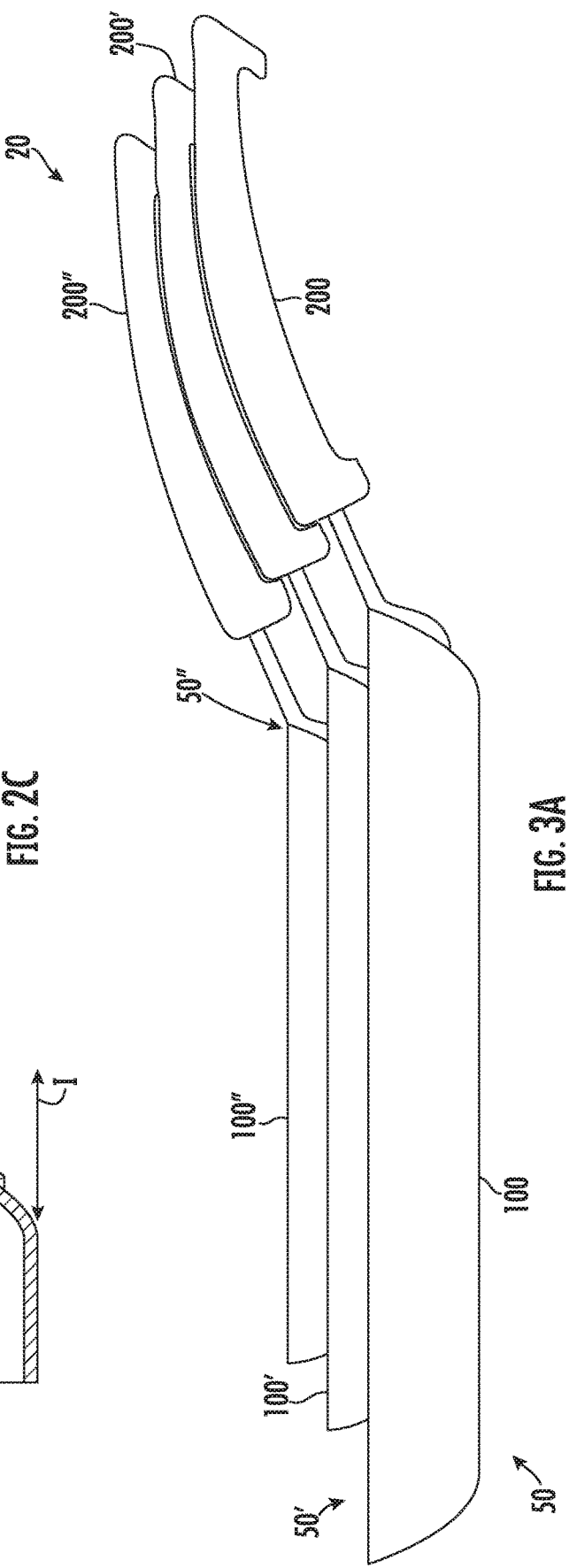

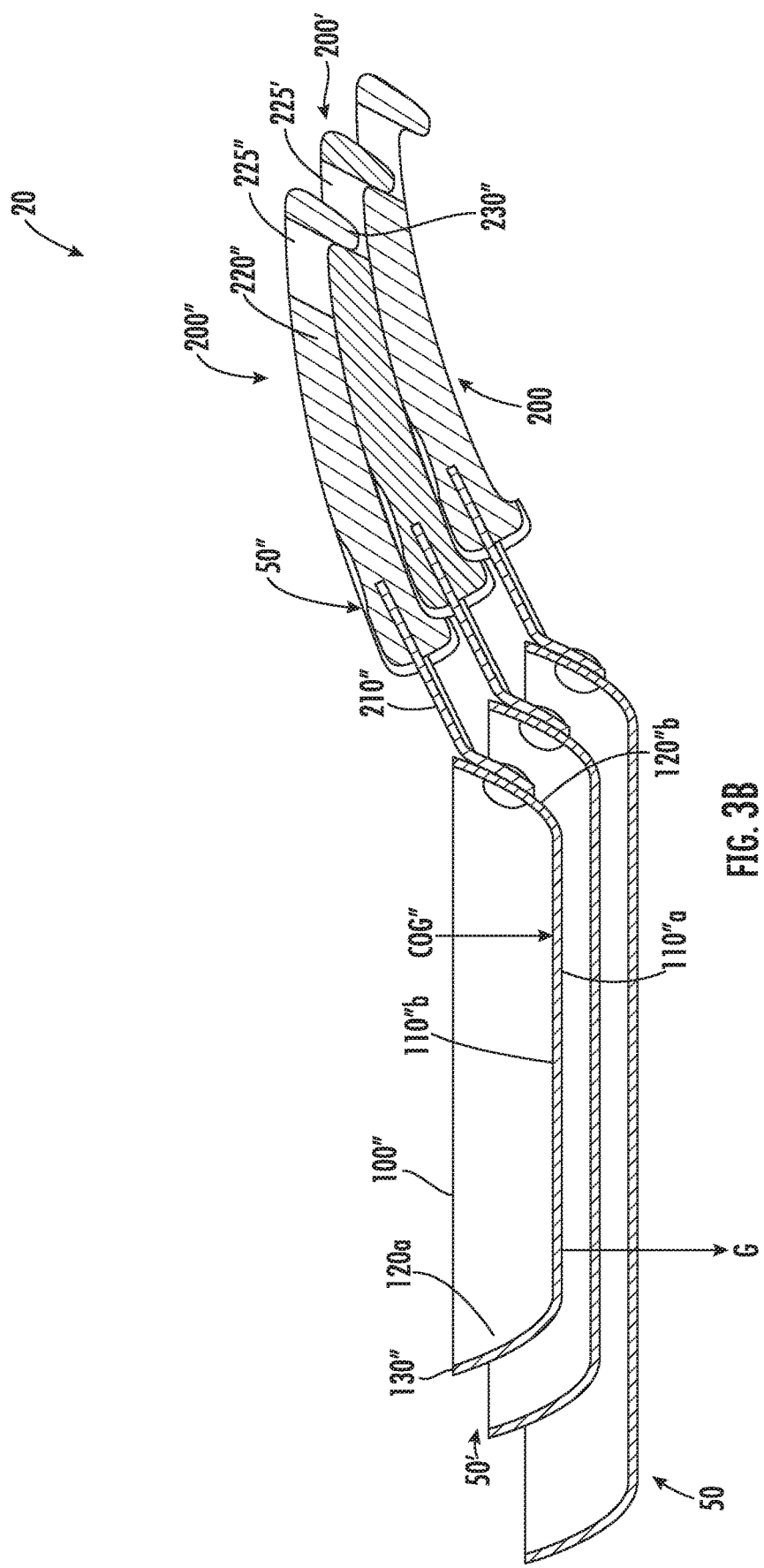

US 10,687,671 B2

COOKWARE ARTICLE AND UTENSIL HANDLE

CROSS-REFERENCE TO RELATED APPLICATIONS

This patent application claims the benefit of the filing date under 35 U.S.C. § 119(e) to U.S. Provisional Patent Application No. 62/474,328, filed on Mar. 21, 2017, the contents of which are hereby incorporated by reference in their entirety.

TECHNICAL FIELD

The present disclosure relates to cookware articles such as cookware vessels and cookware vessel sets, more specifically, the present disclosure relates to stackable cookware articles including cookware vessels and cookware vessel sets.

BACKGROUND

Consumers typically purchase cookware articles in sets including articles of different dimensions, and, hence, often have multiple cooking vessels. However, storing multiple cooking articles having varying dimensions may be cumbersome and inconvenient.

Prior methods of storing cooking vessels include nested storage of stock pots, as it requires less space. In these methods, stacking may be made easier when the stock pot handles are made removable. However, such removable handles are easily lost or damages and can complicate the use of multiple burners or heat sources for cooking.

Institutional and restaurant kitchens frequently stack short fry pans of the same size if the handle is properly shaped; however, such stacked pans tend to progressively skew toward a vertical tilt of the horizontal plane of the vessel rim as the stack grows, making the stack inherently unstable.

SUMMARY

The present disclosure describes cookware article systems and handles thereof configured for the stacking of multiple cookware articles. The cookware articles may include articles of varying dimensions including vessels, utensils, or both that deploy a stackable handle. Staking may include nesting of the multiple cookware articles. The stacking or nesting may be largely contactless along stacked vessels, for example, provided by the stackable handles configured to avoid creating cosmetic defects during storage.

In one aspect, a stackable cookware article system includes a longitudinally extending stackable handle. The handle may include a proximal flange adapted for fixed attachment to a cookware article. The handle may also include a distal grip portion having a proximal end attached to the flange. The grip portion may have an aspect ratio of at least 4:1 between a longitudinal axis and a transverse axis. The grip portion may include a hole and a projection. The hole may extend a depth from an upper surface toward an opposed lower surface of the grip portion and have a forward portion defining at least an upper portion thereof. The hole may be adapted to receive a projection of an upper handle stackably positioned along the upper surface of the grip portion such that the forward portion defining the hole engages a forward portion of the projection received by the hole. The projection may extend downward from the lower surface of the grip portion and have a forward portion. The projection may be adapted to be received within a hole of a lower handle stackably positioned at the lower surface of the grip portion such that the forward portion of the projection engages a complementary forward portion that defines the hole that receives the projection.

In various embodiments, the forward portion of the hole and the forward portion of the projection may be substantially parallel. In one embodiment, the system may also include a cooking vessel comprising a sidewall extending from a bottom wall. The flange may be attached to the sidewall of the vessel, wherein the forward portion of the hole and the forward portion of the projection each form an angle between 70° and 45° with a plane of the bottom wall. In one embodiment, a width of the proximal end of the grip portion may be at least 50% greater than a width of the grip portion taken at the hole. The projection may be positioned distal of the hole. In one embodiment, the grip portion further includes a second projection extending from the lower surface and proximal to the first projection. An inverted valley may be defined along the lower surface between the first and second projections that is adapted to engage a proximal end of a substantially similar grip portion when stacked thereon.

In some embodiments, the system may also include a second handle adapted to stack with the first handle. The second handle may include a proximal flange and a distal grip portion that is attached to the flange at a proximal end. The grip portion of the second handle may include a hole and a projection and may be substantially similar to the grip portion of the first handle. The second handle may be stacked on the first handle wherein the projection of the second handle may extend into the hole of the first handle a distance greater than half the depth between upper and lower surfaces of the first handle. The system may also include a first cooking vessel having a bottom wall and sidewall that is attached to the flange of the first handle, and a second cooking vessel having a bottom wall and a sidewall that is attached to the flange of the second vessel. In one embodiment, each grip portion includes a second projection extending from the lower surface and proximal to the first projection. An inverted valley may be defined along the lower surface between the first and second projections and be dimensioned to engage the proximal end of a substantially similar grip portion when stacked thereon. In one embodiment, the system further includes a lid adapted to fit to a rim of each of the first vessel and the second vessel.

The second handle may be stacked on the first handle. In one example, a length of the second projection of the second handle may set a longitudinal spacing between the sidewalls of the first and second vessels. In another example, the grip portion of the first handle may support the second handle and second vessel and the bottom wall of the second vessel may be suspended over the bottom wall of the first vessel. In another embodiment, the bottom wall of the second vessel may be suspended substantially parallel over the bottom wall of the first vessel. In certain embodiments, the second vessel has a smaller diameter than the first vessel to nest with the second vessel when stacked. In one example, the first and second vessels are skillets. In another example, the first vessel is a generally rectangular pot and the second vessel has a rounded bottom wall.

The system may also include a third handle adapted to interchangeably stack on the first handle or second handle. The third handle may include a proximal flange and a distal grip portion that is attached to the flange at a proximal end. The grip portion of the third handle may include a projection substantially similar to the projections of the first and second handles. In one example, the flange of the third handle may be attached to a working end of a cooking utensil.

In another aspect, a set of two or more cookware articles may be adapted for spaced apart stacking of each article. Each article may include a longitudinally extending stackable handle including a proximal flange attached to a cookware vessel or cooking utensil. The handle may also include a distal grip portion having a proximal end attached to the flange. The grip portion may have an aspect ratio of at least 4:1 between a longitudinal axis and a transverse axis. The grip portion may include a hole and a projection. The hole may extend a depth from an upper surface toward an opposed lower surface of the grip portion and have a forward portion defining at least an upper portion thereof. The hole may be adapted to receive a projection of an upper handle stackably positioned along the upper surface of the grip portion such that the forward portion defining the hole engages a forward portion of the projection received by the hole. The projection may extend downward from the lower surface of the grip portion and have a forward portion. The projection is adapted to be received within a hole of a lower handle stackably positioned at the lower surface of the grip portion such that the forward portion of the projection engages a complementary forward portion that defines the hole that receives the projection.

In various embodiments, the cookware articles comprise a first vessel having a first diameter and a second vessel comprising a second diameter smaller than the first diameter adapted for nested stacking with the first vessel. In one example, the first and second vessels are skillets. In another example, the first vessel is a generally rectangular pot and the second vessel has a rounded bottom. In one embodiment, the set includes a lid adapted to fit to a rim of each vessel in the set. The above and other objects, effects, features, and advantages of the present invention will become more apparent from the following description of the embodiments thereof taken in conjunction with the accompanying drawings.

BRIEF DESCRIPTION OF THE DRAWINGS

FIGS. 1A-1E illustrate an embodiment of a stackable handle for cookware articles according to various embodiments described herein, wherein FIG. 1A is a top plan view, FIG. 1B is a side elevation view, FIG. 1C is a bottom plan view, FIG. 1D is a cross-section taken along section line D-D in FIG. 1B, and FIG. 1E is a cross-section taken along section line E-E in FIG. 1B;

FIGS. 2A-2B illustrate stacked cookware articles comprising the stackable handle embodiment illustrated in FIGS. 1A-1E according to various embodiments described herein, wherein FIG. 2A is a cross-sectional elevation taken along section line A-A of the several pans stacked as shown in the rear elevation view in FIG. 2B;

FIG. 2C illustrates an isolated view of the cross-section elevation of one of the pans illustrated in FIG. 2A showing dimensional features according to various embodiments described herein;

FIGS. 3A-3B provide additional views of the staked cookware articles illustrated in FIG. 2B according to various embodiments described herein, wherein FIG. 3A is a side elevation view and FIG. 3B is a cross-sectional side elevation view thereof corresponding to section line A-A in FIG. 2B;

FIGS. 4A & 4B illustrate another embodiment of stackable handles according to various embodiments described herein, wherein FIG. 4A is a cross-sectional side elevation view of handles for stacking several pans and FIG. 4B is a cross-sectional side elevation view showing dimensional features and a pan attached to one of the handles;

FIGS. 5A-5C illustrate another embodiment of stackable handles according to various embodiments described herein, wherein FIG. 5A is a cross-sectional side elevation of the several pans stacked that deploy the handles, which is further illustrated in an enlarged view in FIG. 5B, and FIG. 5C is a cross-sectional side elevation view showing dimensional features;

FIGS. 6A & 6B illustrate several stacked cooking articles having different dimensions and deploying the stackable handles illustrated in FIGS. 4A & 4B according to various embodiments described herein, wherein FIG. 6A is a cross-sectional side elevation of several stacked vessels taken along section line A-A of FIG. 6B and FIG. 6B is a top plan view thereof;

FIGS. 8A & 8B illustrate several stacked cooking articles having different dimensions and deploying the stackable handles illustrated in FIGS. 4A & 4B according to various embodiments described herein, wherein FIG. 8A is a perspective view of a set of stacked vessels and a utensil disposed on the handle of the upper most vessel and FIG. 8B is a cross-sectional elevation view thereof take along section line B-B in FIG. 8A.

DESCRIPTION

Figure 1A:
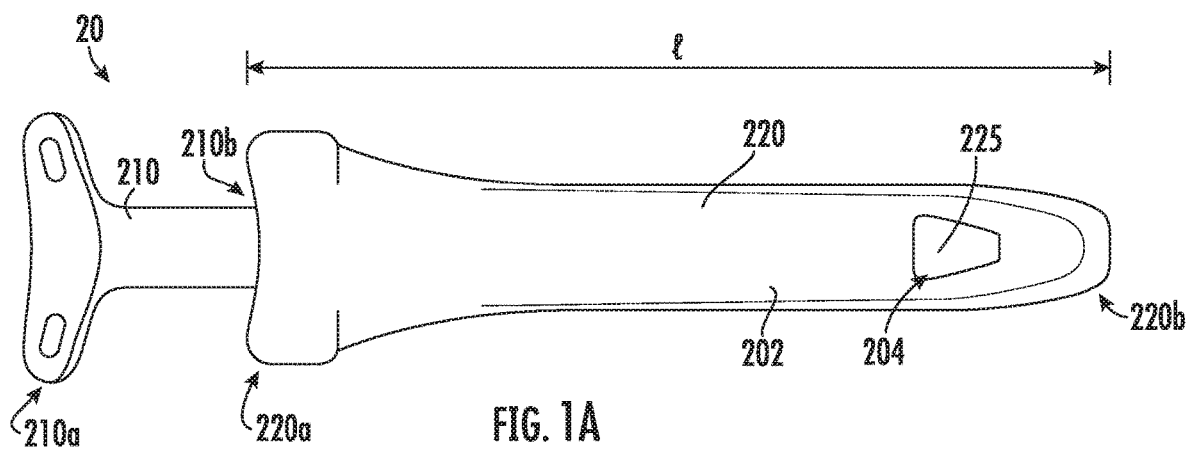
Figure 1B:
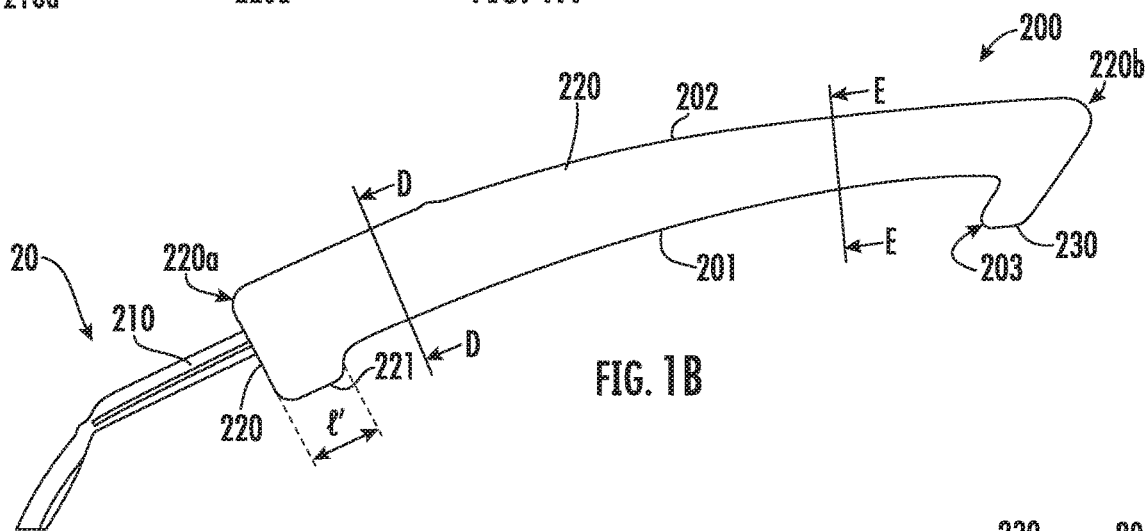
Figure 1C:
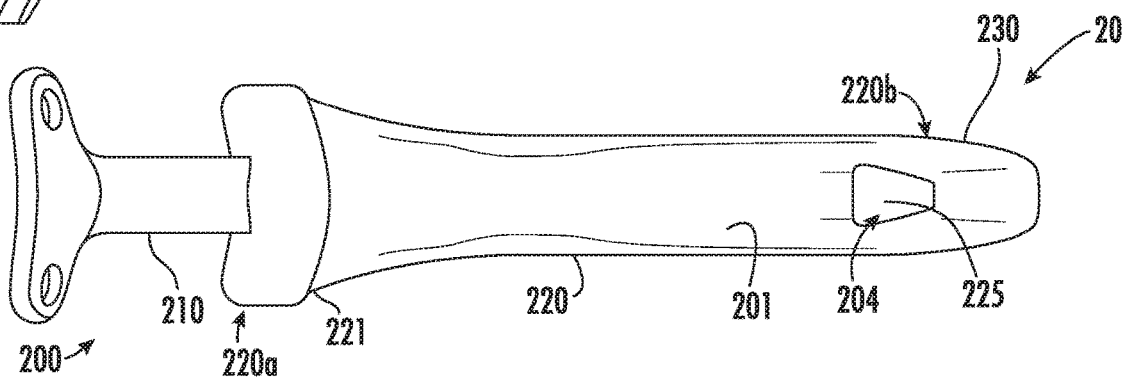
Figure 1D:
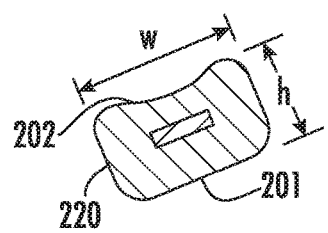
Figure 1E:
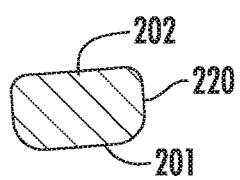

The present disclosure describes stackable cookware systems including cookware articles such as cooking vessels and utensils and sets thereof configured for stacking. The system may be adapted for stable staking of cookware articles having different dimensions such as diameter, height, or length. In various embodiments, cookware articles may be stacked in a nested configuration.

In various embodiments, a stackable cookware system includes stackable cookware handles that may be deployed on a wide variety of cookware articles having different dimensions to thereby allow stable stacking of the articles, which in some embodiments may include stacking in a nested arrangement. Thus, cookware articles may deploy stackable handles providing stable stacking despite the varied dimensions of the articles. Unlike current stackable cookware, the stacking system disclosed herein may include stable established spacing between stacked articles as to not mar delicate finishes. The stacking may be self-stabilizing such that stacked items may be stacked without stacking aids. For example, a lower item in a stack may support the weight of an item that is stacked upon the lower item.

With reference to FIGS. 1A-8B, wherein like reference numerals refer to like components in the various views, a stackable cookware system 20 may include a cookware handle 200 configured for aligned stacking engagement of cookware articles 50 deploying the handle 200. For example, the system 20 may include a plurality of handles 200, 200', 200" each attached to a cookware vessel 100, 100', 100".

Figure 8A:
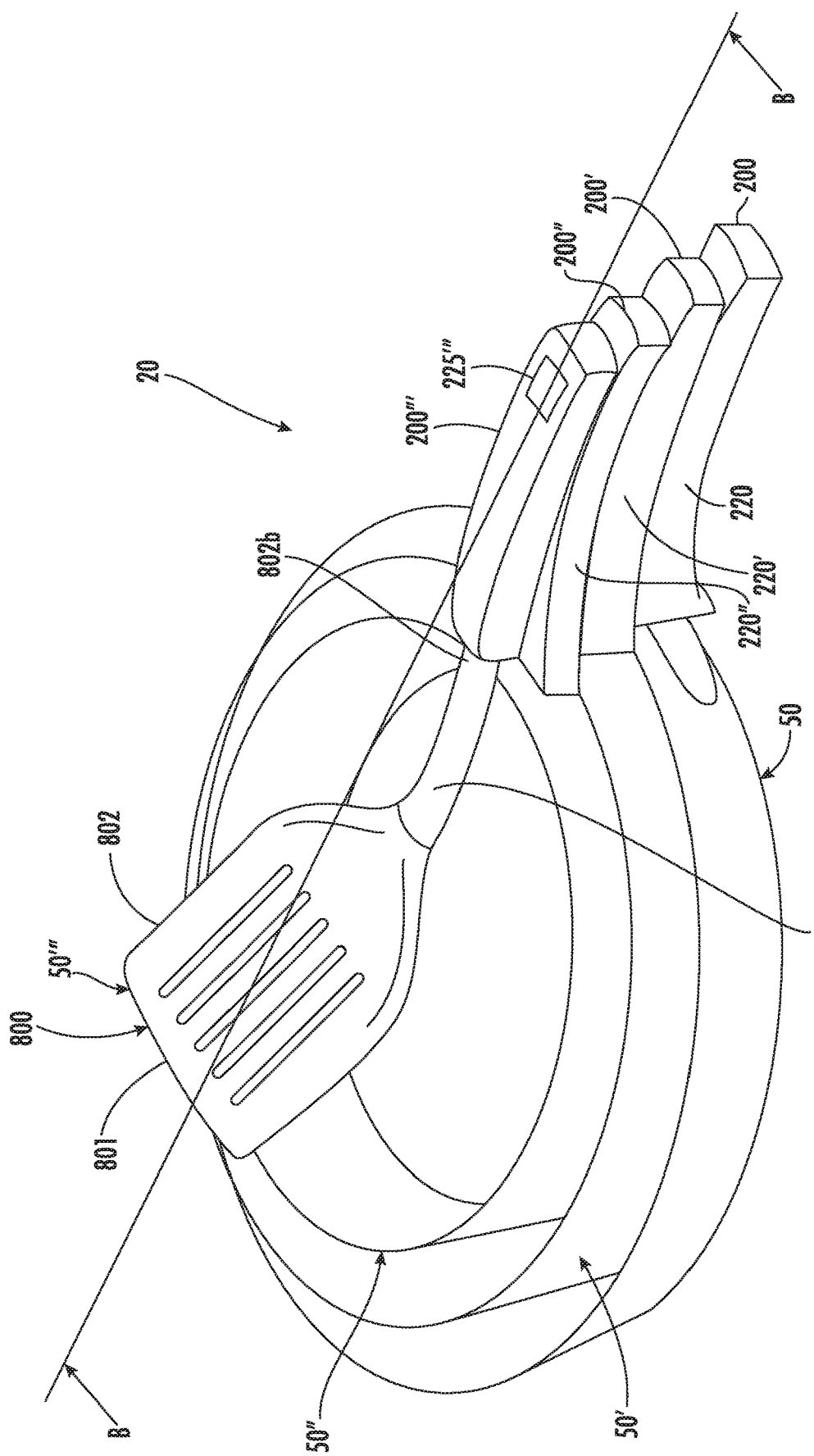
Figure 8B:
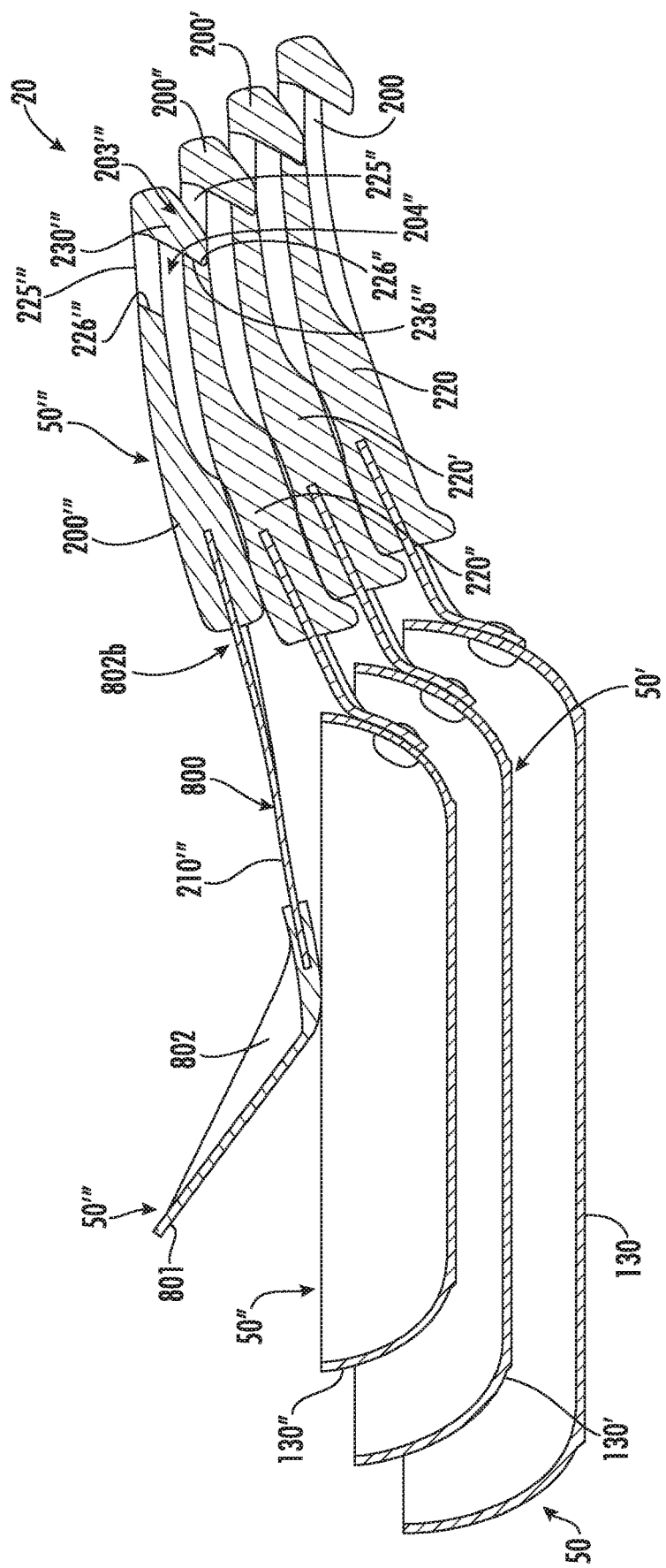

For brevity, various features of the system 20 may be described herein with respect to a single article 50, vessel 100, or handle 200 with reference to the drawings provided by a non-accented reference number. It should be appreciated that such descriptions may be applicable to components depicted in the drawings identified by a corresponding accented reference number. Additionally, while cookware articles 50 are generally illustrated as cookware vessels 100 in the various views, cookware articles 50 may include other cookware items, such as utensils 801 (e.g., as illustrated in FIGS. 8A & 8B) that may deploy the handle 200. For example, in various embodiments, the handle 200 can be deployed on multiple cookware vessels 100 of progressively increasing or decreasing size to provide engagement for aligned nested stacking. In another example, the handle 200 can also be deployed with utensils 801 that are used with other utensils 801 or with other cookware articles 50, such as cookware vessels 100, to stack or rest the handle 200 of the utensil 801 on another handle 200" of a cookware article 50 when the utensil 801 is not actively being used (e.g., as illustrated in FIGS. 8A & 8B). This avoids the need for a separate plate or utensil holder that consumes counter space when the utensil 801 is not being used by the cook to manipulate foods in the cooking vessel 100. It also prevents the utensil 801 from being displaced or soiling the countertop or an adjacent stove or oven surface. In some embodiments, stacking or resting the utensil 801 may result in nesting of the utensil 801 with other stacked cookware articles 50 deploying a substantially similar stackable fitting.

Figure 2A:
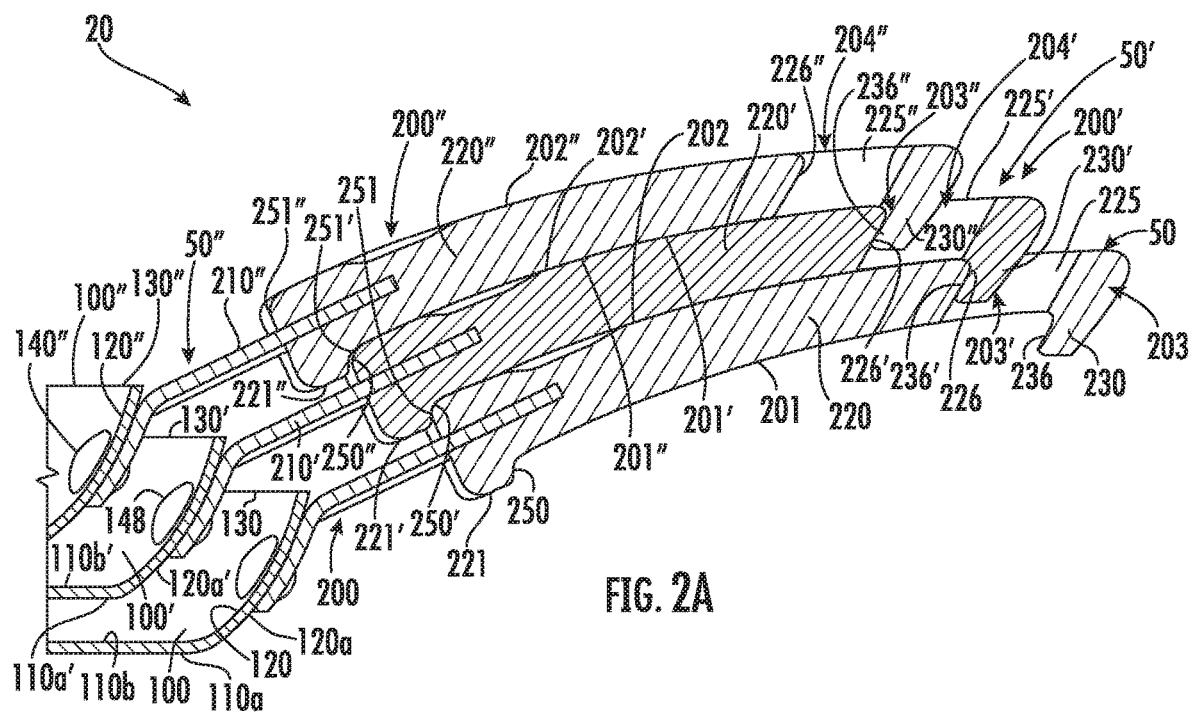
Figure 2B:
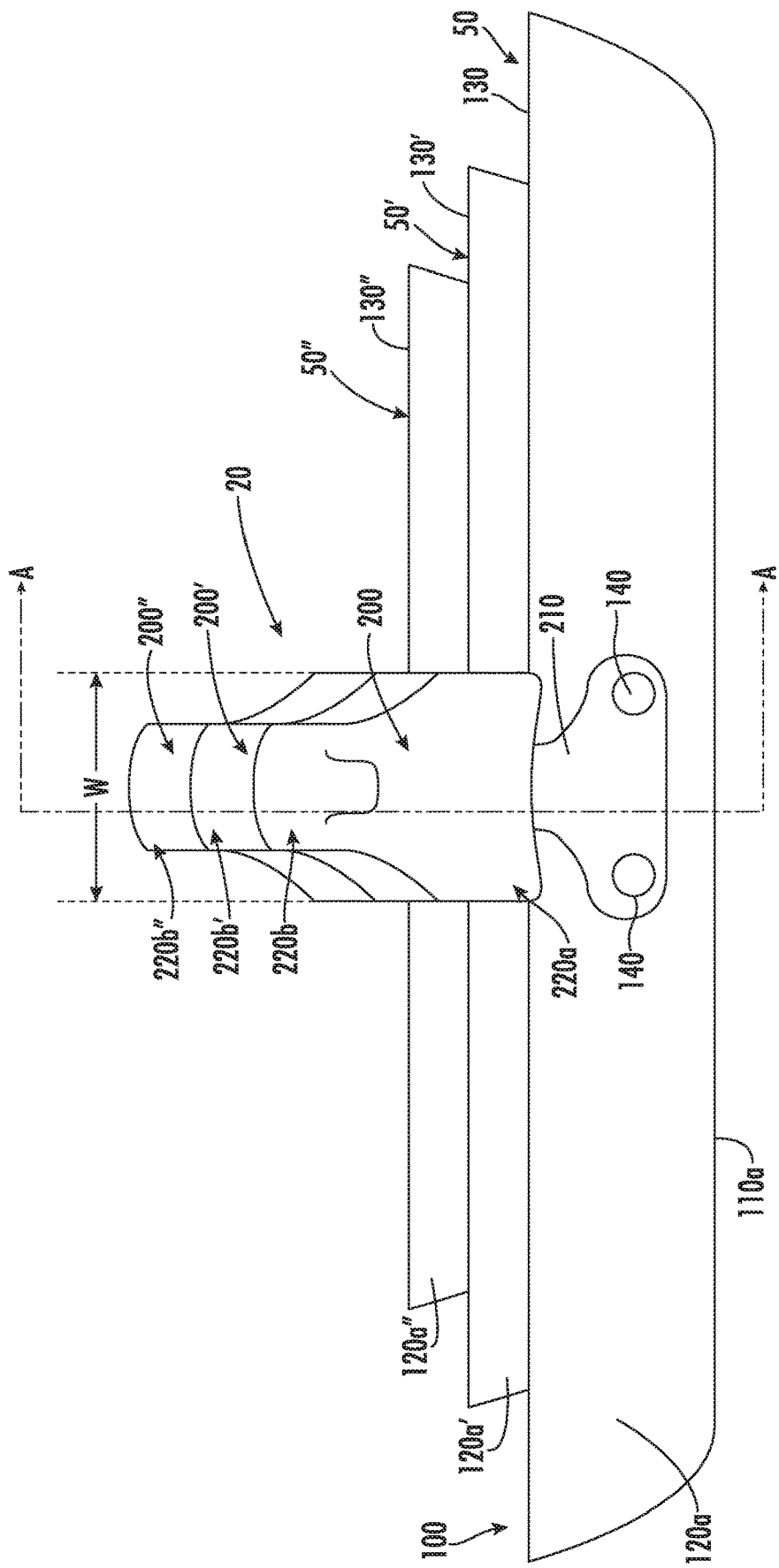
Figure 5A:
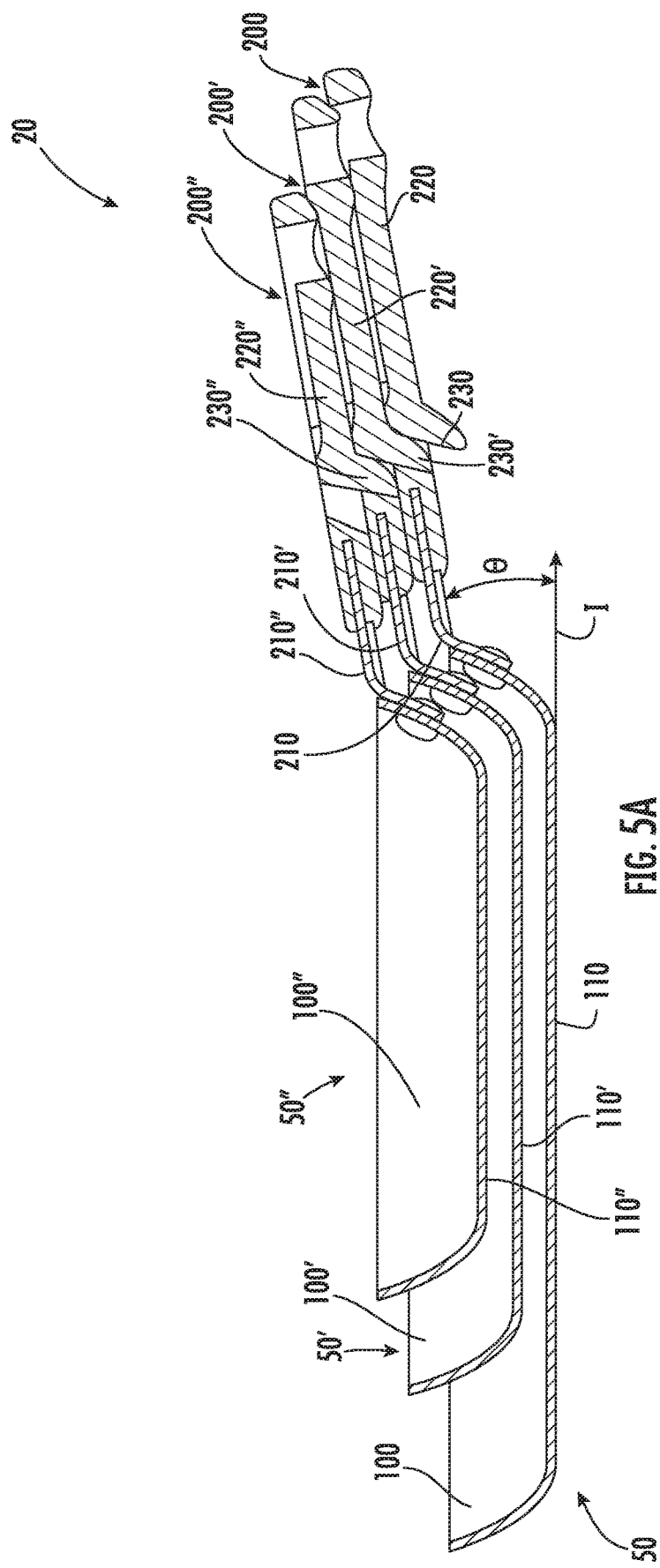

The handle 200 typically includes one or both of a male fitting 203 or a female fitting 204. For example, as depicted in FIG. 2A, among others, a handle 200' may include a male fitting 203' for stackably mating with a female fitting 204 of a second handle 200 and a female fitting 204' for stackably mating with a male fitting 203" of a third handle 200". In such an arrangement, male and female fittings 203', 204 and 203", 204' may engage along engagement surfaces to cooperatively support the weight of the stacked cooking article 50', 50", which may include multiple stacked cooking articles 50, 50', 50". Male and female fittings 203, 204 may be positioned at a rear location (e.g., as shown in FIG. 2A), a forward location (e.g., as shown in FIG. 5A), or another location along the handle 200.

With specific reference to FIGS. 1A-1E, a stackable cookware article system 20 may include a longitudinally extending stackable handle 200 having at least one fitting 203, 204 configured for stackable fitment with another handle having a complementary fitting. The handle 200 may include a flange portion 210 and a grip portion 220. The flange portion 210 may extend from a proximal end 210a to a distal end 210b. The grip portion 220 may similarly extend from a proximal end 220a to a distal end 220b. The flange portion 210 may be attached at its distal end 210a to the proximal end 220a of the grip portion 220.

With further reference to FIG. 2C, the system 20 may include a cookware article 50 comprising a cookware vessel 100 deploying the handle 200. The cookware vessel 100 may include a bottom 110 with an attached upright surrounding sidewall 120 that terminates at a rim 130 along an upper extent. The handle 200 may be coupled to the sidewall 120 along the proximal end 210a of the flange portion 210, such as with rivets 140. Preferably, the flange portion 210 is attached to the sidewall 120 with rivets, although it may also be attached with welded joints as well as with threaded nuts and bolts, and the like. The preferably metal flange 210 also has a narrower cross-section at the common junction with the proximal end 220a of the handle 200. It is to be appreciated that the flange portion 210 and the grip portion 220 may comprise a same or similar material or may comprise a unitary structure wherein the flange portion 210 includes connection junction with a cooking item such as a vessel or utensil.

The grip portion 220 may also include at least one of a male fitting 203 or a female fitting 204 adapted to mate with a complementary male or female fitting of another grip portion 220 configured for stackable fitment. For example, the grip portion 220 may include a female fitting 204 comprising hole 225. While hole 225 may be operable to beneficially hang the handle 200. The hole 225 may also be used for receiving and therein engaging another handle 220' for stacking, as shown in FIG. 2A, for example. The hole 225 is defined by a surrounding portion of the grip portion 220 including forward portion 226. The forward portion 226 is disposed at an oblique angle, $\alpha_1$, with respect to the bottom surface 110 of the vessel, indicated as reference line I and further indicated by parallel reference line I" in FIG. 2C. Forward portion 226 forms a rear engagement surface adapted to engage a male fitting of another handle, such as male fitting 203' of handle 200' as illustrated in FIG. 2A. In some embodiments, hole 225 may extend through the entire height or vertical direction of the grip portion 220, along the distal end 220b of the grip portion 220, e.g., as illustrated in the embodiment illustrated in FIGS. 1A-3B; however, in other embodiments, hole 225 may be defined by only an upper surrounding portion and extend only partially through the grip portion 220 from the upper surface 202, such as at least about 50% or more from an upper side 202 of the grip portion 220.

The male fitting 203 comprises a projection 230 adapted to be received by a complementary female fitting of another handle. The projection 230 may generally extend downward from a lower side 201 of the grip portion 220. The projection 230 may also typically extend from the grip portion 220 at a position distal of the hole 225. However, is some embodiments, a projection 230 may extend from the grip portion 220 at a position proximal of the hole 225 or from a lateral side of the hole 225 in addition to or instead of extending from a position along the lower grip portion 230 distal to the hole 225.

The projection 230 also includes a rear engagement surface adapted to cooperatively engage a corresponding engagement surface of a female fitting 204 for stackable fitment. Engagement surfaces of forward portions 226, 236 may preferably be generally planar; however, some embodiments may include contoured surfaces. In the illustrated embodiment, projection 230 includes a forward portion 236 forming a rear engagement surface adapted to engage a complementary hole of another handle for stacking. For example, with specific reference to FIG. 2A, grip portion 220' of handle 200' includes a projection 230' having forward portion 236' adapted to engage hole 225 of handle 200 at forward portion 226 along at least an upper surrounding portion of the hole 225 when the lower side 201' of the grip portion 220' is disposed along a top side 202 of grip portion 220. Projection 230" of handle 200" is also adapted to be received by hole 225'. When stacked, grip portions 220, 220', 200" may engage along complementary engagement surfaces of forward portions 226, 226' and 236', 236". Engagement surfaces of forward portions 226" and 236 may similarly engage with complementary engagement surfaces of additional handles for stacking.

Forward portion 236 is disposed at an oblique angle, $\alpha_2$, with respect to the bottom surface 110 of the vessel, indicated as reference line I and further indicated by parallel reference line I'" in FIG. 2C. In the illustrated embodiment, forward portion 226 and forward portion 236 are substantially parallel, e.g., +/−5 degrees. Angles $\alpha_1$ and $\alpha_2$ may be substantially similar angles, e.g., +/−5 degrees. This may be particularly beneficial in embodiments wherein the flange 210 angle θ with respect to the bottom surface 110 of the vessel 100 is the same or similar, e.g., +/−5 degrees, between or among similarly shaped stacked articles 50, 50', 50". In other embodiments, the flange 210 angle θ or angles α1 and α2 may be different between or among stacked articles 50, 50', 50", e.g., to address differences in shape, dimensions, or desired use orientation in the stacked articles or handle arc.

The grip portion 220 generally extends laterally and vertically, upward, with respect to the rim 130 and is disposed orthogonal to a line tangent to the rim 130 at a flange-rim junction. The grip portion 220 may generally have an aspect ratio of at least about 4:1, e.g., +/−10%. That is, in some embodiments, the length of the handle may be at least 4 times the smallest width or a width of the grip portion 220 taken along hole 225 or just distal of hole 245 (see, e.g., FIGS. 5A-5C). For example, the length if grip portion 220 may be greater than about 6, about 8, about 12, or more times the smallest width or a width of the grip portion 220 taken along hole 225 or just distal of hole 245. In some embodiments, the grip portion 220 may have an aspect ratio with respect to the largest width of the grip portion 220 of at least 2:1, such as between about 2:1 and about 8:1, about 3:1 and about 6:1, or about 3.5:1 and about 4.5:1, which may include less than 4:1. For example, the length of the grip portion 220 may be greater than about 2 times the largest width of the grip portion 220, such as between about 2 times and about 8 times, about 3 time and about 6 times, or about 3.5 times and about 4.5 times, which may include less than 4 times the largest width of the grip portion 220.

In the illustrated embodiment, handles 200, 200', 200" are substantially similar and are configured to interchangeably stack each other when associated vessels 100, 100', 100" are so compatible. For example, vessels 100, 100', 100" are configured for nesting from a larger base vessel 100 or 100' to a smaller upper vessel 100' or 100", otherwise projection 230 may be similarly received by hole 225' and hole 225". Thus, vessels 100, 100', 100" deploying substantially similar handles 200, 200', 200", grip portions 220, 220', 220", complementary male and female fittings 203, 204 may be stably stacked with the bottoms 110, 110', 110" spaced apart and generally parallel to each other. Stacking may also result in the vessels 100, 100', 100" of other stacked cookware items being longitudinally spaced apart. In a further embodiment, projection 230 may be received by a complementary hole, such as a hole substantially similar to hole 225, 225', 225", and hence a complementary female fitting of another handle. Such stacking may include nesting when the handle comprising the complementary female fitting is deployed with a larger vessel or other compatibly dimensioned item for stacking with handle 200 and associated vessel 100. In the embodiments illustrated in FIGS. 1A-8B, and as noted above, projections 230 generally extend downward from a lower side 201 of the grip portion 220; however, in other embodiments (not shown) a projection 230 may extend generally upward from an upper side 202 of the grip portion to therealong similarly engage a complimentary hole of an upper handle, which may similarly include an upward extending projection to further mate with another upper handle.

Unless indicated otherwise, substantially similar means substantially similar dimensions (+/−5%) without negating corresponding functionalities described with respect to the feature or sub-feature thereof. For example, a grip portion that is substantially similar to another grip portion 220' that is described as having a hole 225' and a projection 230' adapted for stackably mating another handle 200, 200" would include a hole and a projection having dimensions within +/−5% corresponding to those of grip portion 220' and that are adapted for stackably matting handles 200, 200' having complementary projections 230" and holes 225.

With specific reference to FIGS. 2A-3B, is should now be appreciated that the outward extending handle 200 may include a female fitting 204 comprising a hanging or other hole 225 in the grip portion 220 that is adapted to stackably receive a complementary male fitting of another handle, such as downward extending projection 230' of male fitting 203'. The handle 200 may also include a male fitting 203 comprising a projection 230 configured to be stackably received by a complementary female fitting of another handle, such as projection 230' may be received in at least an upper inner surrounding portion of the hole 225 wherein the forward portion 226 engages the complimentary forward portion 236' of the projection 230'. Accordingly, a set of two or more cookware articles 50, 50', 50" may deploy substantially similar handles 200, 200', 200", grip portions 220, 220', 220", or substantially similar or compatible fittings 203, 203', 203", 204, 204', 204" adapted for stackable fitment of the handles 200, 200', 200". For example, projection 230" of handle 200" may be similarly received in at least an upper inner surrounding portion of hole 225' of handle 200' wherein the forward portion 226' engages the complimentary forward portion 236" of the projection 230". As such, handles 200, 200', 200" may stably nest the vessels 100, 100', 100" without external portions (such as exterior walls 120a', 120a" and exterior bottoms 110a', 110a") of an inner nested vessel 100', 100" contacting the internal portion (such as interior walls 120b, 120b' and interior bottom 110b, 110b') of the outer surrounding vessel 100, 100'.

As noted above, projections 230', 230" and complementary holes 225, 225' are configured to engage along rear engagement surfaces of forward portions 236', 236" and 226, 226' to cooperatively support, at least in part, the weight of a stacked cooking article 50', 50". The handle 200 may also include one or more forward engagement surfaces adapted to engage engagement surfaces of another handle to cooperatively support, at least in part, the weight of the stacked cooking article. In the illustrated embodiment, grip portion 220 includes forward engagement surfaces comprising forward portion 251 and forward portion 250, each adapted to engage a complementary engagement surfaces of another handle. For example, with reference to FIG. 3B, which illustrates the lateral position of the center of gravity (COG) of the upper vessel 110" in the stack, indicated by downward pointed arrow COG", support of the vessel 110" to the right of the COG by the handle 200' results in a net gravitation torque on the pan, indicated by vector G, that must be resisted by the engaging handles 200' and 200". The distal engagement of the projection 230" in hole 225' along rear complementary engagement surfaces of forward portions 226' and 236" and the proximal engagement of forward complementary engagement surfaces 251' and 250" cooperate to resist this torque. The torque is further resisted by larger contact area that results from a distal widening of the handle 200' between forward portion 251' and forward portion 250', indicated as width W in FIG. 2B.

The handle 200 or flange portion 210 of the handle 200 that extends between the vessel 100 sidewall 120 and the grip portion 220 may be disposed at any angle θ with respect to reference plane 1 of the bottom 110 of the vessel 100. However, the flange 210 and grip portion 220 are preferably shaped so that angles $\alpha_1$ and $\alpha_2$ are generally between about 70° and about 45°, such as between about 65° and about 50°, preferably between about 65° and about 55°, more preferably between about 65° and about 60° with respect to the bottom 110 of the vessel (or horizontal reference plane with respect to the operative orientation of the vessel 100). For example, with respect to the stacking of articles 50, 50' having angles $\alpha_1$ and $\alpha_2$ that are generally between about 70° and about 55°, such as between about 65° and about 50°, preferably between about 65° and about 55°, more preferably between about 65° and about 60° with respect to the bottom 110 of the vessel (or horizontal reference plane), to allow the interface of the engagement surfaces of forward portions 226, 236', when so engaged, to resists the torque that acts to rotate the upper vessel 100' in counter clockwise rotation. Stated another away, the flange 210 and grip portion 220 are preferably shaped so that forward portions 226, 236 are positioned at angles between about 20° and bout 45°, such as between about 25° and about 40°, preferably between about 25° and about 45°, more preferably between about 25° and about 30° from a vertical reference plane with respect to the operative orientation of the vessel 100.

It should also be appreciated that the grip portion 220 may be shaped to facilitate the stable mated engagement of the multiple vessels 100 in a stack. As introduced above, a widening of proximal end 220a of the of the grip portion 220 relative to the distal end 220b, e.g., the rear engagement surfaces of forward portions 226, 236 thereof, may provide increased lateral stability, limiting rocking. The projection 230 may be dimensioned to descend more than half the height of a complementary hole along the forward portion thereof. The grip portion 220 may be adapted to widen at the proximal end 220a, adjacent the flange 210, to a width that is at least 50% greater than the width of the grip portion 220 at the hole 225. In some embodiments, the grip portion 220 may be adapted to widen at the proximal end 220a, adjacent to flange 210, to a width that is at least 50% greater than the width of the projection 230 or forward portion 236. The shape of the upper 202 and lower surfaces 201 between the forward engaging surfaces 250, 251 and the hole 225 may have a complimentary shape to further stabilize the stacked arrangements of the multiple vessel 100, 100', 100".

The grip portion 220 may also include a second proximal downward projection 221 adjacent the junction with the flange 210. The first and second projections 230, 221 together define an inverted valley 222 along the length (indicated by length "1" in FIG. 1A) of the grip portion 220. The second proximal downward projection 221 may have a length (indicated by length l' in FIG. 1B) that sets the longitudinal spacing between stacked vessels 100, 100' and 100" having flanges 210, 210', 210" of the same length (e.g., as shown in FIG. 2A).

In various embodiments, the handle 200 may employ various contours between forward and rear engagement surfaces. For example, the embodiment illustrated in FIGS. 1A-3B include a gradual distal reduction in height along a subtle downward arc from the θ angle, and, when stacked, the upper 202, 202' and lower surfaces 201', 201" extending between the forward and rear engagement surfaces of the grip portions 220, 220', 220" approximate, while not necessarily maintaining consistent contact.

Figure 4A:
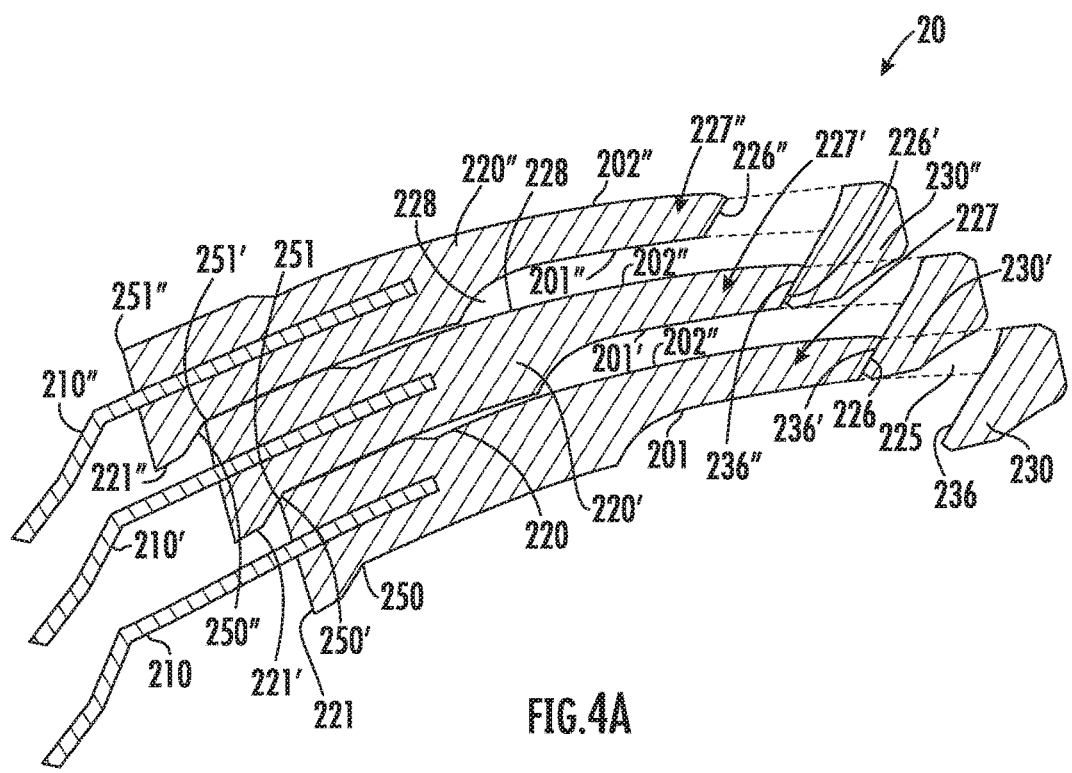
Figure 4B:
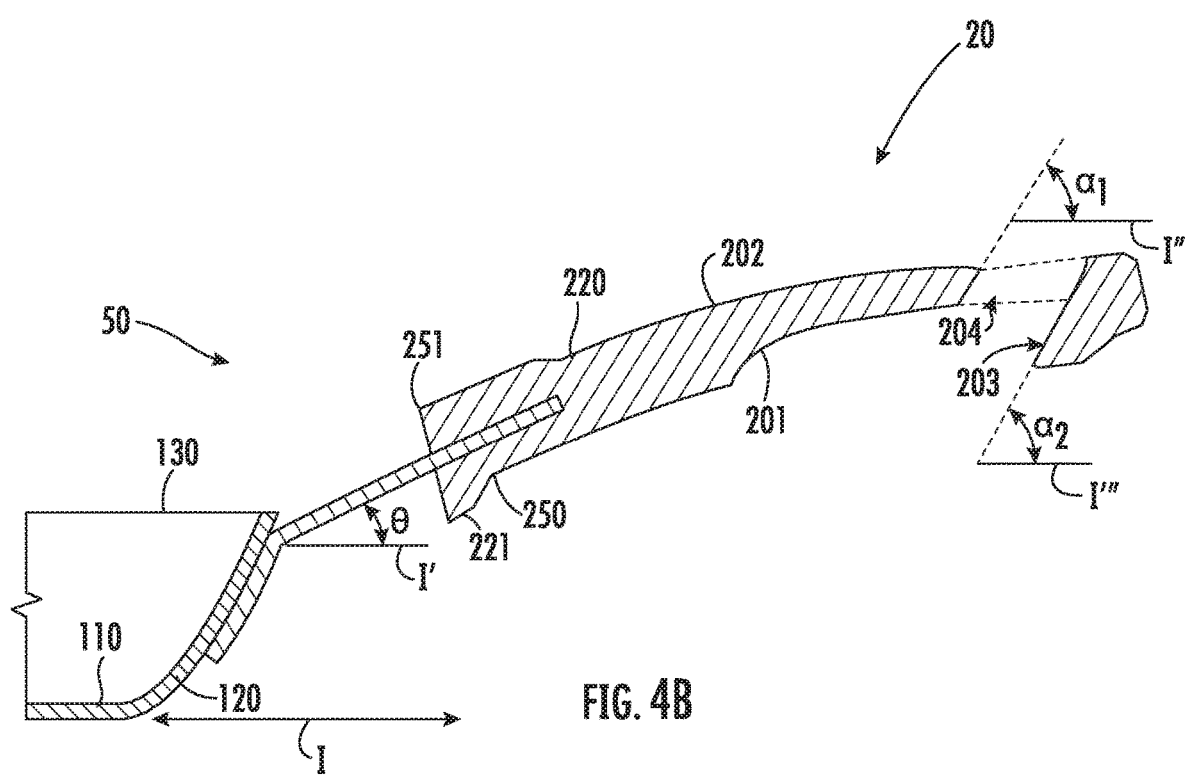

FIGS. 4A & 4B illustrate another embodiment of a stackable cookware article system 20 comprising a longitudinally extending handle 200. The system 20 may include a set of two or more cookware articles 50, 50', 50" may deploy handles 200, 200', 200" deploying substantially similar handles 200, 200', 200", grip portions 220, 220', 220", or substantially similar or compatible fittings 203, 203', 203", 204, 204', 204" adapted for stackable fitment of the handles 200, 200', 200". The handle 200 may be generally configured similar to the embodiment described above with respect to FIGS. 1A-3B; however, the height of the grip portion 220 may include a substantial distal decrease between forward and rear engagement surfaces, therebetween forming a reduced girth region 227 configured to provide a favorable gripping area. The reduced girth region 227 may result from a greater decrease in height along the lower surface 201 than along the upper surface 202 relative to the arcing midline of the grip portion 220. For example, when two or more handles 200, 200', 200" are stacked, gaps 228 may be formed between the upper 202, 202' and lower surfaces 201', 201" along the reduced girth regions 227', 227", which may provide a user a location to grip the handles 200, 200', 200" during stacking and unstacking.

As introduced above with respect to FIGS. 1A-3B, projection 230 may be dimensioned to extend within a complementary hole a distance greater than 50% of the height of the grip portion. In the embodiment illustrated in FIGS. 4A & 4B, projection 230 is dimensioned to extend into a complementary hole to position approximately flush with the lower surface of the grip portion. For example, projections 230', 230" extend into complimentary holes 225, 225' such that forward portions 236', 236" and forward portions 226, 226' engage along the height of the grip portions 220, 220' from the upper surface 202 to the lower surface 201. In other embodiments, one or more of the projections 230, 230', 230" may extend downward a greater or lesser distance within a complementary hole 225, 225', 225" such that the projection 230, 230', 230" does not extend to become flush with a lower surface 201, 201', 201" of a grip portion 220, 220', 220" upon which it is stacked. Similarly, in some embodiments, a grip portion 220, 220', 220" may include a greater or lesser degree of distal arc from the θ angle such that the projection 230, 230', 230" does not extend to become flush with a lower surface 201, 201', 201" of a grip portion 220, 220', 220" upon which it is stacked.

Figure 5B:
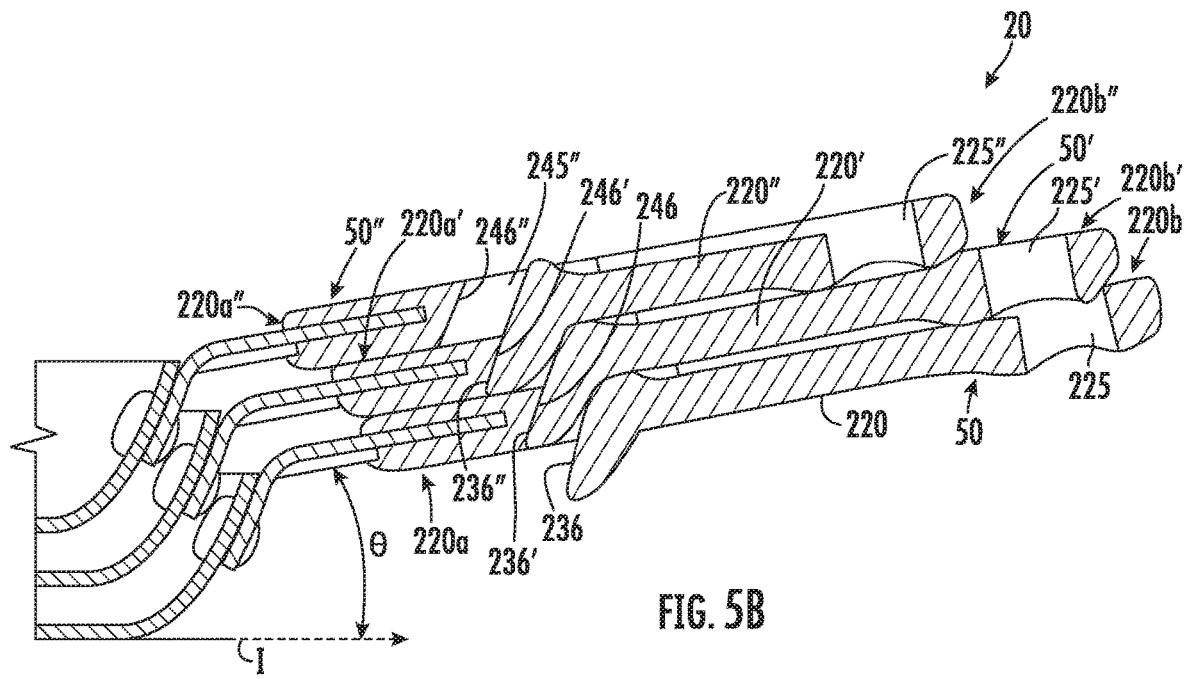
Figure 5C:
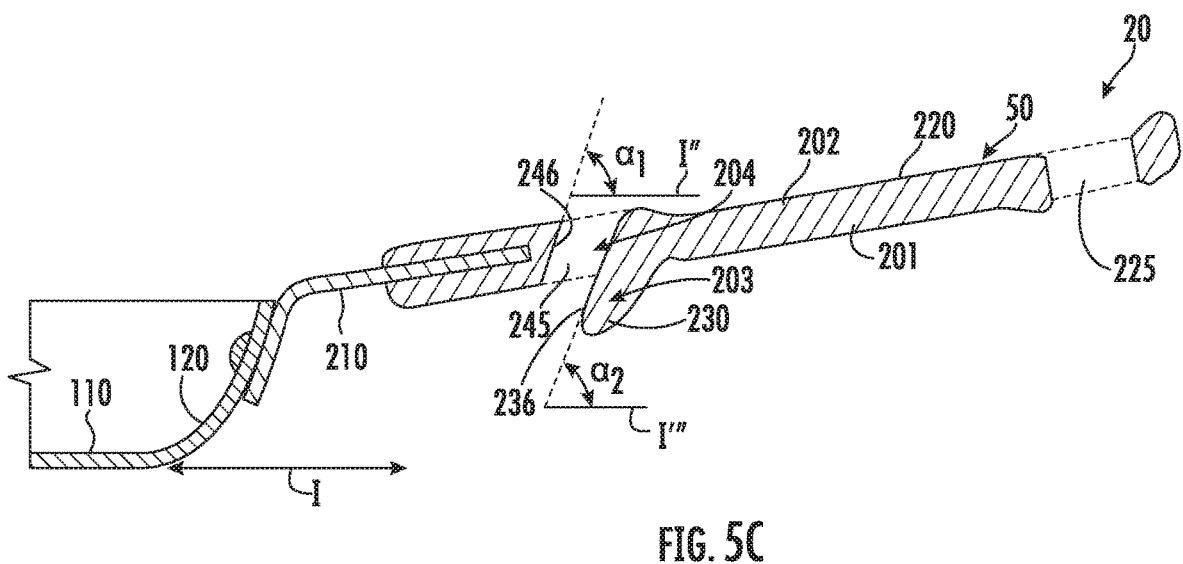

The embodiments illustrated in FIGS. 1A-4B include rear positioned male and female fittings 203, 204; however, in other embodiments, one or both of a male or female fitting 203, 204 may be positioned more forward along the grip portion 220, e.g., as illustrated in FIGS. 5A-5C.

FIGS. 5A-5C illustrate another embodiment of a stackable cooking article system 20 comprising a handle 200. As shown, handle 200 includes a hole 225 along the distal end 220b of the grip portion 220 configured to provide ease of hanging the article 50 for storage purposes. The handle 200 also includes a female fitting 204 comprising a second hole 245 along the grip portion 220 that is position more proximal to the flange 210 than hole 225. The handle 220 further includes a male fitting 203 comprising a projection 230 that extends downward from the lower surface 201. The projection 230 may typically extend from the grip portion 220 at a position associated with a distal extent of the hole 245. However, in some embodiments, a projection 230 may extend from the grip portion 220 at a position proximal of the hole 245 or from a lateral side of the hole 245 in addition to or instead of extending from a position along the lower grip portion 230 distal to the hole 245.

The projection 230 also includes an engagement surface adapted to cooperatively engage a complementary engagement surface of a complementary hole for stacking. In the illustrated embodiment, projection 230 includes a forward portion 236 forming an engagement surface adapted to engage an engagement surface of another handle for stacking. For example, with specific reference to the magnified view in FIG. 5B, grip portion 220' of handle 200' includes a projection 230' having forward portion 236' adapted to engage complementary hole 245 of handle 200 at forward portion 246 along at least an upper surrounding portion of the hole 245 when the lower side 201' of the grip portion 220' is stackably disposed along a top side 202 of grip portion 220. Projection 230" of handle 200" is also adapted to be received by complementary hole 245'. Forward portion 236 is disposed at an oblique angle, $\alpha_2$, with respect to the bottom surface 110 of the vessel, indicated as reference line I and further indicated by parallel reference line I''' in FIG. 5C. Forward portion 236, 236', 236" of projection 230, 230', 230" may be adapted to have the complimentary shape to that of at least opposing surface of engagement portion 246, 246', 246" of a complementary hole 245, 245', 245".

The system 20 may include a set of two or more cookware articles 50, 50', 50" that deploy one or more of substantially similar handles 200, 200', 200", substantially grip portions 220, 220', 220", or substantially similar or compatible fittings 203, 203', 203", 204, 204', 204" adapted for stackable fitment of the handles 200, 200', 200". As shown, vessels 100, 100', 100" deploy handles 200, 200', 200" comprising substantially similar or compatible fittings 203, 203', 203", 204, 204', 204" adapted for stackable fitment of the handles 200, 200', 200". Similar to the embodiments described with respect to FIGS. 1A-4B, the handle 200 or flange portion 210 of the handle 200 that extends between the vessel 100 sidewalls 120 and the grip portion 220 in the embodiment illustrated in FIGS. 5A-5C may be disposed at any angle from the reference plane 1 of the bottom 110 of the vessel 100. The handle 200 or flange portion 210 of the handle 200 that extends between the vessel 100 sidewall 120 and the grip portion 220 may be disposed at any angle θ with respect to reference plane 1 of the bottom 110 of the vessel 100. However, the flange 210 and grip portion 220 are preferably shaped so that angles α1 and α2 are generally between about 70° and about 45°, such as between about 65° and about 50°, preferably between about 65° and about 55°, more preferably between about 65° and about 60° with respect to the bottom 110 of the vessel (or the horizontal reference plane with respect to the operative orientation of the vessel 100) so that the interface of the engagement surfaces of forward portions 236' and 246 when so engaged resists the torque that acts to rotate the upper vessel 100' in counter clockwise rotation. Stated another away, the flange 210 and grip portion 220 are preferably shaped so that engagement surfaces of forward portion 236' of projection 230' and opposing engagement surface of forward portion 246 are positioned at angles between about 20° and bout 45°, such as between about 25° and about 40°, preferably between about 25° and about 45°, more preferably between about 25° and about 30° from a vertical reference plane with respect to the operative orientation of the vessel 100. In the illustrated embodiment, angle θ is approximately 10 degrees. Forward portion 246 and forward portion 236 comprise substantially parallel surfaces, e.g., +/−5 degrees and angles $\alpha_1$ and $\alpha_2$ form substantially similar angles, e.g., +/−5 degrees with bottoms 110, 110', 110". Thus, when stacked, grip portions 220, 220', 200" engage along complementary engagement surfaces of forward portions 246, 246' and 236', 236" and bottoms 110, 110', 110" are spaced apart and generally parallel to each other. Engagement surfaces of forward portions 246" and 236 may similarly engage with complementary engagement surfaces of other handles for stacking. Also, when stacked, a lower extent of projections 230', 230" extend approximately flush with the lower surfaces 201, 201' of the handles 200, 201'. However, as described above, projections 230 preferably extend 50% or more through the hole 245. Thus, in some embodiments, a projection 230 may not extend entirely through hole 245 when stacked.

In the illustrated embodiment, handle 200" includes a grip portion 220" having a shorter longitudinal length than handles 200 and 200'. The dimensions of the grip portions 220, 220', 200" may be otherwise substantially similar. In another embodiment, grip portions 220, 220', 200" may have the same lengths or any one or all of the grip portions 220, 220', 220" may have different lengths. Despite the difference in length, the length of the handles 200, 200', 200" proximal to engagement surfaces of forward portions 246, 246', 246" is substantially the same; thus, each vessel 100, 100', 100" is spaced apart longitudinally an equal distance when stacked. In other embodiments, lengths of handles 200, 200', 200' proximal to corresponding engagement surfaces may be different between or among handles 200, 200', 200" to adjust longitudinal spacing between stacked items.

Similar to that described above with respect to FIGS. 1A-4B, it is preferable that the flange portion 210b between the vessel rim 130 and the grip portion 220 is narrower than the width of the proximal end of the grip 220a and that the height of the flange portion 210b is also shorter than the height of the grip at portion 220a, as shown in FIGS. 5A-5C. This avoids having the flange portion 210, 210', 210" interfere with the desired flush stacking of the upper sides 201, 201', 201" and lower sides 202, 202', 202" of the grip portions 220, 220', 220" in each stacked arrangement. Flange portion 210 is also preferably has a narrower cross-section at the common junction with the proximal end 220a of the handle 200. The grip portion 220 may widen at the proximal end 220a, adjacent the flange 210, to a width greater width than the grip portion 220 at the hole 245. For example, the width at the proximal end 220a of the grip portion 220, adjacent to the flange 210, may be at least 50% greater than the width of the grip portion 220 at the hole 245.

Figure 6A:
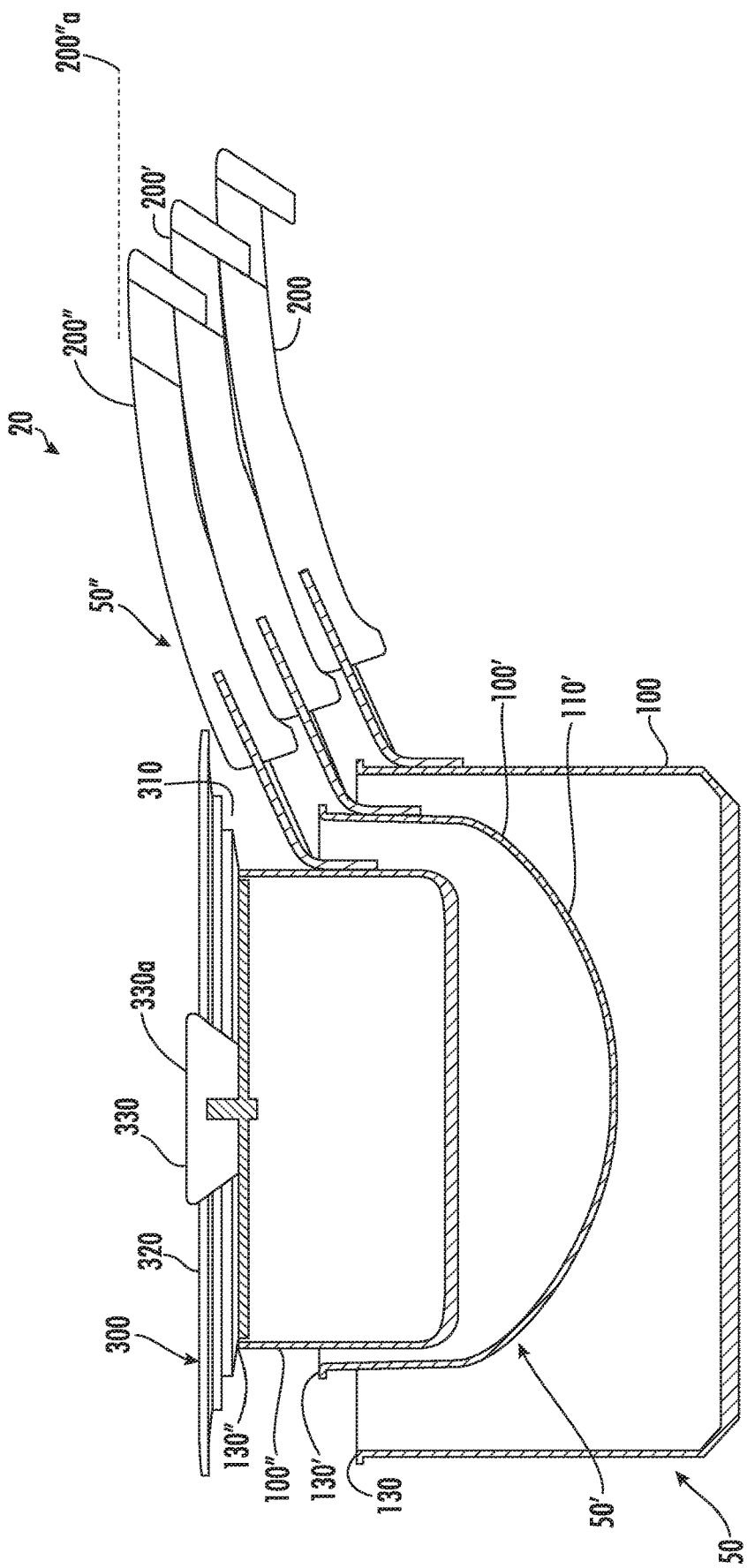
Figure 6B:
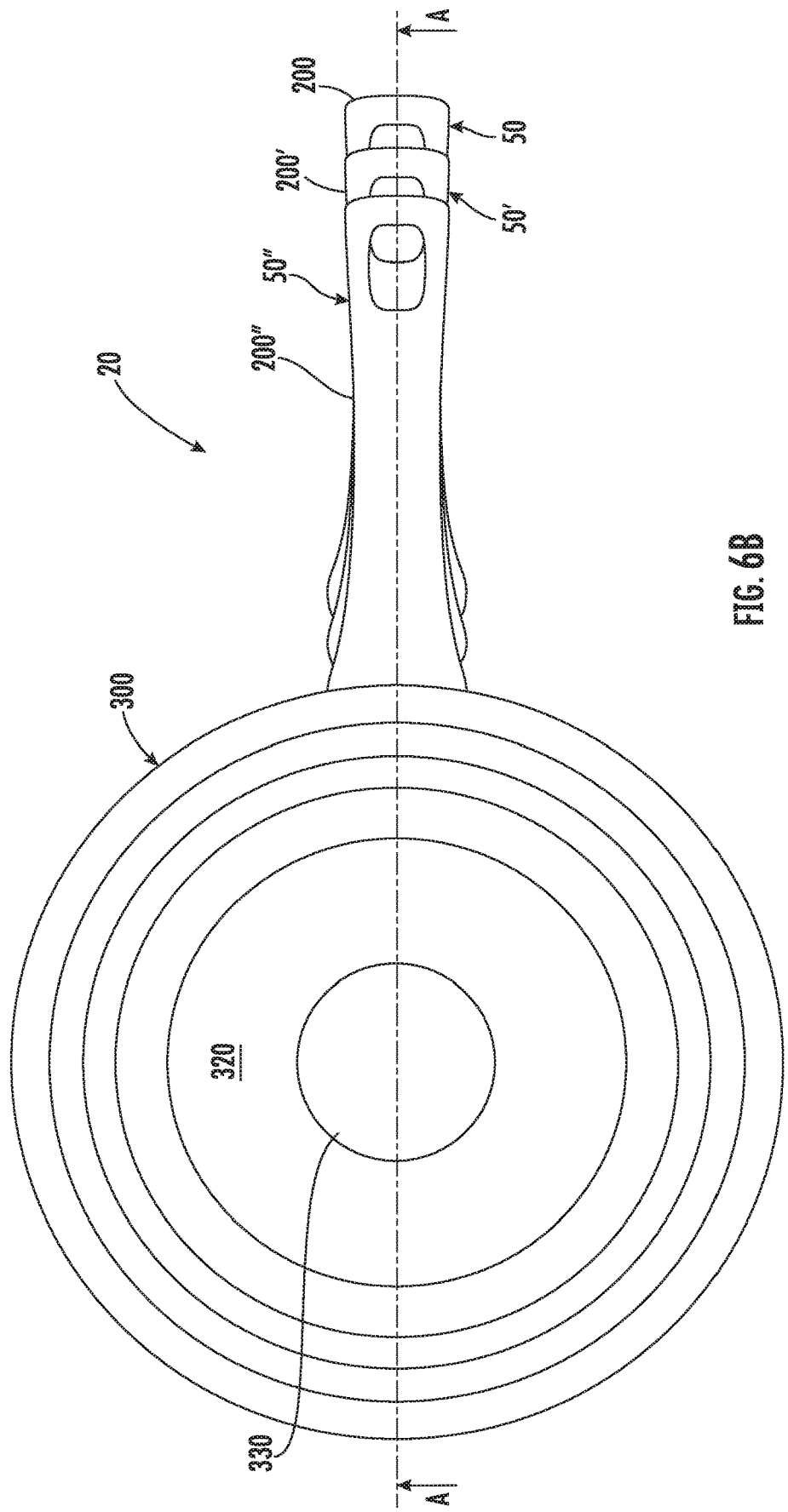

FIGS. 6A-6B illustrate another embodiment of the system 20 for stacking cooking articles 50, 50', 50". The system 20 includes a handle 200 dimensioned for stacking, as described herein. The system 20 may include two or more handles 200, 200', 200" having substantially similar dimensions as described above with respect to FIGS. 1A-3B used to support and nest a set of vessels 100, 100' and 100". While vessels 100 and 100" have a generally rectangular cross-sectional shape of a sauce pan, rather than the flatter shaped skillets of the other embodiments, the intermediate vessel 100' has a rounded or hemispherical bottom 110' such that in combination with the lower vessel 100 it forms a useful double boiler configuration for melting and whisking ingredients.

Handles 200 and 200' stably mate as described with respect to the other embodiments, facilitating holding the vessels 100, 100' in combination with one handle 200 while the other hand may be used to manipulate a whisk.

The system 20 also includes a lid 300 configured to interchangeably fit any of the vessels 100, 100' and 100". For example, the lid 300 includes a contoured stepped lower surface 310 comprising a plurality of steps 311, 312, 313 moving outward from a central portion 314 of the lid 300. In the illustrated embodiment, the lid 300 includes three steps 311, 312, 313, wherein each which each step has a progressively larger diameter 311d, 312d, 313d. The diameters of each step 313, 312, 312 progressively decrease to a diameter smaller than the progressively decreasing diameters of the vessel 100, 100', 100" at the rim 130, 130', 130". Thus, the contoured step surface 310 is dimensioned to locate along a rim 130, 130', 130" of any of the vessels 100, 100', 100". That is, step 311 has an inner diameter 311d smaller than the inner diameter (Di) of the vessel 100" at rim 130", while the adjacent step 312 has an inner diameter 312d that is greater than the outer diameter (Do) of the vessel 100". Step 312 has an inner diameter 312d smaller than the inner diameter (Di') of the vessel 100' at rim 130', while the adjacent step 313 has an inner diameter 313d that is greater than the outer diameter (Do') of the vessel 100'. Step 313 has an inner diameter 313d smaller than the inner diameter (Di) of the vessel 100 at rim 130, while the outer diameter (Do) of the vessel 100 at rim 130 is smaller than a diameter 300d of the lid 300.

Figure 7:
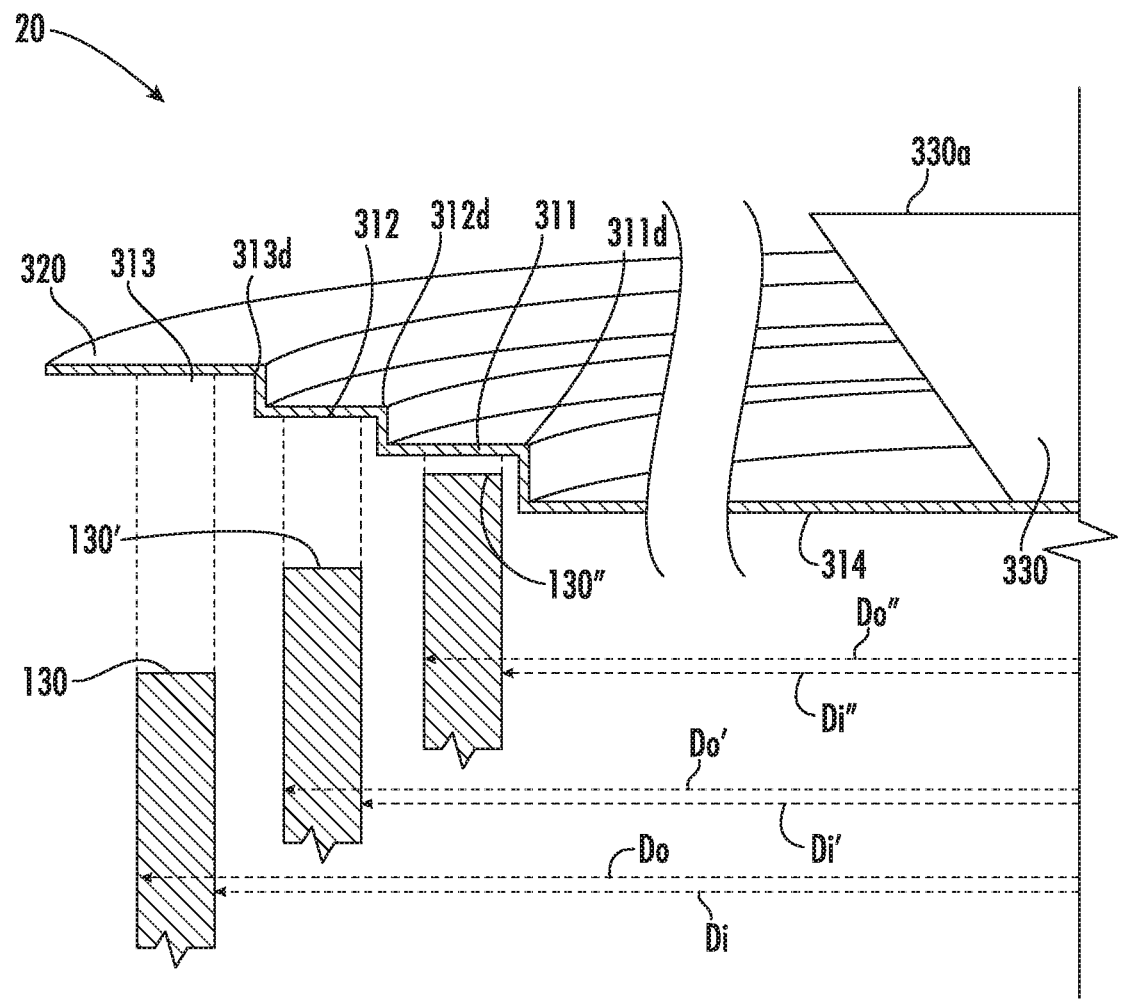
FIG. 7 is a cross-sectional elevation of a portion of the lid illustrated in FIG. 6A compared with the location of the rim of several vessels that can be stacked in a set as shown in any of the preceding figures according to various embodiments described herein.

The lid 300 included with the set of cooking articles 50, 50', 50" in FIGS. 6A & 6B preferably has such a series of steps, with each step intended to span the width of the rim 130 from Do to Di. The lid 300 may include a flat or planar upper surface 320. The lid 300 may be compact and the top 330a of the lid handle 330 may be disposed below the upper extent (reference line 200"a in FIG. 6A) of the upper handle 200" in the set. Lid 300 may therefore comprise a handle 330 wherein at least a portion extends above the upper surface 320, but also below the reference line 200"a. While FIG. 7 illustrates an upper surface 320 of the lid 300 as having a corresponding planar stepped surface, in various embodiments, the lid 300 may include an upper surface 320 that is not stepped. For example, the upper surface may have a level planar surface or include raised regions extending over one or more steps 313, 312, 311 between diameter 300d and the central portion 314. The upper surface may also slant downward from the outer edge along a planar or curved surface over one or more steps 313, 312, 311 toward the central portion 314 of the lid 300. It is to be appreciated that the lid 300 may be configured for use with any stackable system 20 according to the present disclosure. The lid 300 may also be configured for use with other cooking articles to provide universal use or interchangeable use with multiple cooking articles, whether or not such articles are stackable.

FIGS. 8A & 8B illustrate a further embodiment of the system comprising a cooking article 50''' comprising a utensil 800, such as spatula 801, and a stackable handle 200'''. The utensil 800 is illustrated as being stackable with at least one additional handle 200, 200', 200" or cooking articles 50, 50', 50". The additional handle 200, 200', 200" or cooking articles 50, 50', 50" may be configured in a manner similar to that described with respect to FIGS. 4A & 4B.

The utensil 800 may be configured with a handle 200''' consistent to that which is disclosed herein for stackable use with other handle configurations. As shown, handle 200''' is attached to a distal end 802b of a working end 802 and includes a flange 210''' and a grip portion 220'''. The grip portion 220''' includes a male and female fitting 203''', 204''' that are substantially similar and complementary to fittings 203, 203', 203", 204, 204', 204" of grip portions 220, 220', and 220", which, as noted above, may be similar to that described above with respect to FIGS. 4A & 4B. Grip portion 220''' includes a male fitting 203''' comprising a projection 230''' positioned distal of a female fitting 204''' comprising a hole 225''', which may also be used as a hanging hole 225'''. To stack the utensil 800, the projection 230''' may be positioned in hole 225" of grip portion 220" wherein forward portion 236''' of projection 230''' may engage forward portion 226" of hole 225". It will be appreciated that utensil 800 so configured can be supported on the corresponding handle 200", 200' 200 of any of the articles 50", 50', 50. Accordingly, utensil 800 may be supportable on the corresponding handle 200", 200', 200 of any of the vessels 100", 100" or 100 during cooking as well as for convenient storage. As noted above, the grip portion 220''' includes a hole 225''' adapted to receive a projection of another handle. Thus, a complementary projection extending from a handle of another cooking article, such as another utensil, may be received within hole 225''' and therein engage forward portion 226''' to stack the cooking article on handle 200'''. In other embodiments, handle 200''' may not include a hole 225''' configured for receiving a projection for stacking.

As shown, the grip portion 220''' does not include a second projection and extends a reduced length relative to the other grip portions 220, 220', 220". In other embodiments, the grip portion 220''' may be configured to include a second projection or extend a same length as one or more grip portions 220, 220', 220" upon which it may stack.

In various embodiments, the working end 802 of the utensil 800 may be a blade like appendage, such as spatula 801, or other configuration such as a concave shape for a spoon, tongs for a fork like device, engaging prongs for tongs or the like.

Figure 9:
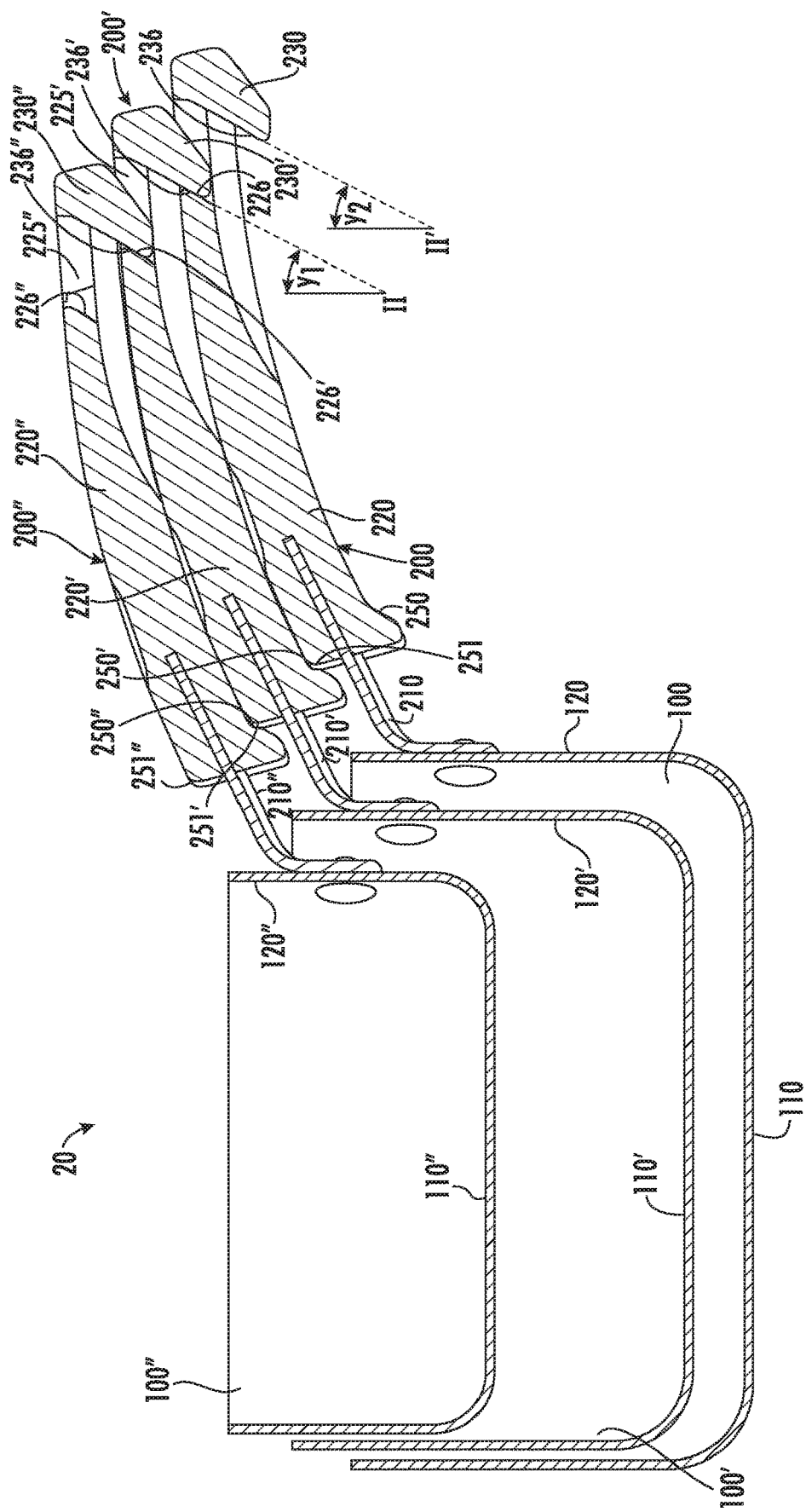
FIG. 9 illustrates a cross-sectional elevation of stacked cookware articles comprising a stackable handle embodiment according to various embodiments described herein.

FIG. 9 illustrates a cross-sectional elevation of stacked cookware articles comprising a stackable handle system 20 according to one embodiment. The stackable handle system 20 includes two or more stacked sauce pans 100, 100", 100'''. The stackable handles 200, 200'', 200''' may be similar to that described above with respect to FIGS. 4A-4B and 8A-8B, wherein like numbers reference like features. The handle 200 or flange portion 210 of the handle 200 extends between the vessel 100 sidewall 120 and the grip portion 220. Forward engagement surfaces 226, 236 are positioned at angles $\gamma 1$ and $\gamma 2$ with respect to sidewall 120 (or a vertical reference plane, illustrated as lines II and II', with respect to the operative orientation of the pan). The flange 210 and grip portion 220 are preferably shaped so that angles $\gamma 1$ and $\gamma 2$ are between about 20° and bout 45°, such as between about 25° and about 40°, preferably between about 25° and about 45°, more preferably between about 25° and about 30°. Angles $\gamma 1$ and $\gamma 2$ may correspond to those of angles $\alpha 1$ and $\alpha 2$ with respect to the bottom 110 of the vessel (or a horizontal reference plane corresponding to the operative orientation of the pan). For example, the flange 210 and grip portion 220 may be preferably shaped so that forward portions 226, 236 are positioned at angles between about 70° and about 45°, such as between about 65° and about 50°, preferably between about 65° and about 55°, more preferably between about 65° and about 60° with respect to the bottom 110 of the vessel (or the horizontal reference plane). With respect to the stacking of articles 100, 100', 100" in FIG. 9, angles $\gamma 1$ and $\gamma 2$ are between about 20° and bout 45°, such as between about 25° and about 40°, preferably between about 25° and about 45°, more preferably between about 25° and about 30°, to allow the interface of the engagement surfaces of forward portions 226 and 236', 226' and 236", when so engaged, to resists the torque that acts to rotate the upper vessel 100' in counter clockwise rotation. The hole 225 is dimensioned together with projection 230 to provide proper clearance between sidewalls 120 of the vessels 100 when stacked. The clearance is preferably greater than about 2.2 mm, more preferably greater than 2.3 mm.

In the illustrated embodiments, all the articles or handles thereof include both male and female fittings; however, is some embodiments, not all articles or handles in the system include both male and female fittings. For example, in one embodiment wherein the system includes a set of stackable cookware articles wherein one of the articles is configured to be the base article when the articles are stacked, e.g., the base article is too large to nest with the other articles, the grip portion of the article may not include a male fitting along its lower surface. Similarly, in one embodiment wherein the system includes a set of stackable cookware articles wherein one of the articles is configured to be stacked on other articles but not to form a base article upon which other articles may be stacked, e.g., the article is too small or uniquely shaped for other articles to nest with, the article may not include a female fitting along its upper surface. However, as the systems described herein include expandable or modular systems in which very different articles may be stacked, is some embodiments, all handles may be configured for receiving another article for stacking or being received by another article for stacking and may include both male and female fittings.

As will be appreciated, the disclosed stackable cookware article systems and stackable handle configurations thereof may be configured for use with various cookware articles such as pots, pans, and utensils. The stackable cookware article systems and stackable handle configurations thereof may find beneficial use with respect to convenient and stable storage. The stackable cookware article systems and stackable handle configurations thereof may further find beneficial use with respect to other nested storage applications such as minimization of packing bulk for storing and shipping of products in the various streams of commerce before they reach the consumer. Thus, systems so configured may beneficially provide more compact storage and shipping configurations for cooking items such as cooking vessels having different dimensions.

This disclosure describes various elements, features, aspects, and advantages of various embodiments, configurations, and arrangements of a stackable cookware article system and handles thereof. It is to be understood that certain descriptions of the various embodiments and such configurations and arrangements thereof have been simplified to illustrate only those elements, features and aspects that are relevant to a more clear understanding of the disclosed embodiments, while eliminating, for purposes of brevity or clarity, other elements, features and aspects. Any references to "various," "certain," "some," "one," or "an" when followed by "embodiment," "configuration," "example", "arrangement" or the like generally means that a particular element, feature or aspect described in the example is included in at least one embodiment. The phrases "in various," "in certain," "in some," "in one," or "in an" when followed by "embodiment", "configuration", "example", "arrangement" or the like may not necessarily refer to the same embodiment. Furthermore, the phrases "in one such", "in this", or the like when followed by "embodiment," "configuration," "example," "arrangement" or the like while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It also is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a" component means one or more components, and thus, possibly, more than one component is contemplated and may be employed or used in an application of the described embodiments. Further, the use of a singular noun includes the plural, and the use of a plural noun includes the singular, unless the context of the usage requires otherwise.

What is claimed is:

1. A stackable cookware article system, the system comprising:
    a longitudinally extending stackable handle comprising:
        a proximal flange adapted for fixed attachment to a cookware article; and
        a distal grip portion having a proximal end attached to the flange and having an aspect ratio of at least 4:1 between a longitudinal axis and a transverse axis, the grip portion comprising:
            a hole extending a depth from an upper surface toward an opposed lower surface of the grip portion and having a forward portion, wherein the forward portion of the hole is disposed at a forward slanting angle that causes a bottom section of the forward portion of the hole to be positioned at a location that is closer to the flange along a horizontal axis than a top section of the forward portion of the hole, wherein the hole is adapted to receive a projection of an upper handle stackably positioned along the upper surface of the grip portion such that the forward portion of the hole engages a forward portion of the projection received by the hole; and
            a projection extending downward from the lower surface of the grip portion and having forward portion, wherein the forward portion of the projection is disposed at a forward slanting angle that causes a bottom section of the forward portion of the projection to be positioned at a location that is closer to the flange along the horizontal axis than a top section of the forward portion of the projection, wherein the projection is adapted to be received within a hole of a lower handle stackably positioned at the lower surface of the grip portion such that the forward portion of the projection engages a complementary forward portion of the hole that receives the projection.

2. The system of claim 1, wherein the angle of the forward portion of the hole and the angle of the forward portion of the projection are substantially parallel.

3. The system of claim 1, further comprising a cooking vessel comprising a sidewall extending from a bottom wall, the flange attached to the sidewall of the vessel, wherein the angle of the forward portion of the hole and the angle of the forward portion of the projection are each between 70° and 45° with a plane of the bottom wall.

4. The system of claim 1, wherein a width of the proximal end of the grip portion is at least 50% greater than a width of the grip portion taken at the hole.

5. The system of claim 1, wherein the projection is distal of the hole.

6. The system of claim 1, wherein the grip portion further comprises
a second projection extending from the lower surface and proximal to the proximal end, and
an inverted valley defined along the lower surface between the first and second projections and adapted to engage a proximal end of a substantially similar grip portion when stacked thereon.

7. The system of claim 1, further comprising a second handle adapted to stack with the first handle, the second handle comprising a proximal flange and a distal grip portion that is attached to the flange at a proximal end, wherein the grip portion of the second handle comprises a hole and a projection, wherein the grip portion of the second handle is substantially similar to the grip portion of the first handle.

8. The system of claim 7, wherein, when the second handle is stacked on the first handle, the projection of the second handle extends into the hole of the first handle a distance greater than half the depth between upper and lower surfaces of the first handle.

9. The system of claim 7, further comprising a first cooking vessel having a bottom wall and sidewall that is attached to the flange of the first handle and a second cooking vessel having a bottom wall and a sidewall that is attached to the flange of the second vessel.

10. The system of claim 9, wherein each of the grip portions further comprise
a second projection extending from the lower surface and proximal to the proximal end, and
an inverted valley defined along the lower surface between the first and second projections and adapted to engage the proximal end of a substantially similar grip portion when stacked thereon, and
wherein, when the second handle is stacked on the first handle, a length of the second projection of the second handle sets a longitudinal spacing between the sidewalls of the first and second vessels.

11. The system of claim 9, wherein, when the second handle is stacked on the first handle, the grip portion of the first handle supports the second handle and second vessel and the bottom wall of the second vessel is suspended over the bottom wall of the first vessel.

12. The system of claim 11, wherein, when the second handle is stacked on the first handle, the bottom wall of the second vessel is suspended substantially parallel over the bottom wall of the first vessel.

13. The system of claim 12, wherein the second vessel has a smaller diameter than the first vessel to nest with the second vessel when stacked.

14. The system of claim 11, wherein the second vessel has a smaller diameter than the first vessel to nest with the second vessel when stacked, wherein the first and second vessels are skillets.

15. The system of claim 11, wherein the second vessel has a smaller diameter than the first vessel to nest with the second vessel when stacked, and wherein the first vessel is a generally rectangular pot and the second vessel has a rounded bottom wall.

16. The system of claim 11, wherein further comprising a lid adapted to fit to a rim of each of the first vessel and the second vessel.

17. The system of claim 11, further comprising a third handle adapted to interchangeably stack on the first handle or second handle, the third handle comprising a proximal flange and a distal grip portion that is attached to the flange at a proximal end, wherein the grip portion of the third handle comprises a projection, wherein the projection is substantially similar to the projections of the first and second handles, and wherein the flange of the third handle is attached to a working end of a cooking utensil.

18. A set of two or more cookware articles adapted for spaced apart stacking of each article, wherein each article comprises a longitudinally extending stackable handle comprising:
a proximal flange attached to a cookware vessel or cooking utensil; and
a distal grip portion having a proximal end attached to the flange and having an aspect ratio of at least 4:1 between a longitudinal axis and a transverse axis, the grip portion comprising
a hole extending a depth from an upper surface toward an opposed lower surface of the grip portion and having a forward portion, wherein the forward portion of the hole is disposed at a forward slanting angle that causes a bottom section of the forward portion of the hole to be positioned at a location that is closer to the flange along a horizontal axis than a top section of the forward portion of the hole, wherein the hole is adapted to receive a projection of an upper handle stackably positioned along the upper surface of the grip portion such that the forward portion of the hole engages a forward portion of the projection received by the hole, and
a projection extending downward from the lower surface of the grip portion and having a forward portion, wherein the forward portion of the projection is disposed at a forward slanting angle that causes a bottom section of the forward portion of the projection to be positioned at a location that is closer to the flange along the horizontal axis than a top section of the forward portion of the projection, wherein the projection is adapted to be received within a hole of a lower handle stackably positioned at the lower surface of the grip portion such that the forward portion of the projection engages a complementary forward portion of the hole that receives the projection.

19. The set of two or more cookware articles of claim 18, wherein the cookware articles comprise a first vessel having a first diameter and a second vessel comprising a second diameter smaller than the first diameter adapted for nested stacking with the first vessel.

20. The set of two or more cookware articles of claim 19, wherein the first and second vessels are skillets.

21. The set of two or more cookware articles of claim 19, wherein the first vessel is a generally rectangular pot and the second vessel has a rounded bottom.

22. The set of two or more cookware articles of claim 19, further comprising a lid adapted to fit to a rim of each vessel in the set.

* * * * *